(12) United States Patent
Cooley et al.

(10) Patent No.: US 9,611,885 B1
(45) Date of Patent: Apr. 4, 2017

(54) LUBRICATED SUPERHARD BEARING ASSEMBLIES

(71) Applicant: US Synthetic Corporation, Orem, UT (US)

(72) Inventors: Craig H Cooley, Saratoga Springs, UT (US); Timothy N Sexton, Genola, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 809 days.

(21) Appl. No.: 13/776,940

(22) Filed: Feb. 26, 2013

(51) Int. Cl.
  *F16C 17/00* (2006.01)
  *F16C 33/02* (2006.01)
  *F16C 17/02* (2006.01)
  *F16C 33/74* (2006.01)

(52) U.S. Cl.
  CPC ............. *F16C 17/02* (2013.01); *F16C 33/02* (2013.01); *F16C 33/74* (2013.01)

(58) Field of Classification Search
  CPC .......... E21B 10/22; E21B 21/12; E21B 4/003; F16C 2352/00; F16C 17/02; F16C 17/04; F16C 17/10; F16C 33/12; F16C 33/121; F16C 33/26; F16C 33/02; F16C 33/043; F16C 33/74; F16J 15/32
  USPC .................................................. 165/104.19
  See application file for complete search history.

(56) References Cited

U.S. PATENT DOCUMENTS

| | | | |
|---|---|---|---|
| 1,269,582 A * | 6/1918 | Daimler | F16C 17/04 384/368 |
| 4,211,291 A * | 7/1980 | Kellner | E21B 4/00 173/DIG. 4 |
| 4,410,054 A * | 10/1983 | Nagel | E21B 4/003 175/107 |
| 7,866,418 B2 | 1/2011 | Bertagnolli et al. | |
| 7,998,573 B2 | 8/2011 | Qian et al. | |
| 8,034,136 B2 | 10/2011 | Sani | |
| 8,236,074 B1 | 8/2012 | Bertagnolli et al. | |
| 8,668,388 B1 * | 3/2014 | Peterson | F16C 17/026 384/123 |

(Continued)

OTHER PUBLICATIONS

U.S. Appl. No. 13/306,332, filed Nov. 29, 2011, Peterson, et al.

(Continued)

*Primary Examiner* — Adam D Rogers
(74) *Attorney, Agent, or Firm* — Dorsey & Whitney LLP

(57) ABSTRACT

Embodiments to bearing apparatuses for placement into a borehole containing a drilling fluid in which the apparatus is configured for transferring heat to the drilling fluid from a lubricating fluid substantially sealed within the apparatus. The apparatus includes a substantially sealed housing, first and second bearing assemblies disposed about a rotatable shaft extending through the housing, where the bearing assemblies are within the substantially sealed housing. Each bearing assembly includes superhard bearing elements. One bearing assembly is fixed relative to the shaft so as to rotate therewith, while another bearing assembly is fixed relative to the housing. In an embodiment, a lubricating fluid for lubricating the superhard bearing elements may circulate from within a circulation cavity of the housing or shaft between the superhard bearing elements, and be recirculated back into the circulation cavity. In other embodiments, the lubricating fluid may not be recirculated.

24 Claims, 21 Drawing Sheets

(56) References Cited

U.S. PATENT DOCUMENTS

| | | | |
|---|---|---|---|
| 9,400,012 B2* | 7/2016 | Iwata | F16C 33/1045 |
| 2012/0318479 A1* | 12/2012 | Chang | F28F 13/06 |
| | | | 165/104.19 |
| 2015/0152915 A1* | 6/2015 | Peterson | F16C 33/043 |
| | | | 384/115 |
| 2015/0233423 A1* | 8/2015 | Peterson | F16C 33/043 |
| | | | 384/416 |

OTHER PUBLICATIONS

U.S. Appl. No. 13/410,514, filed Mar. 2, 2012, Peterson, et al.
U.S. Appl. No. 13/550,821, filed Jul. 17, 2012, Peterson, et al.
U.S. Appl. No. 13/550,835, filed Jul. 17, 2012, Sexton, et al.

* cited by examiner

LUBRICATED SUPERHARD BEARING ASSEMBLIES

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

Each thrust-bearing apparatus includes a stator that may not rotate and a rotor that is attached to the output shaft and that may rotate with the output shaft. The stator and rotor each include a plurality of bearing elements that provide bearing surfaces that bear against each other during use.

In operation, high-pressure drilling fluid is circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated. This load is commonly referred to as "on-bottom thrust", which compression load is carried, at least in part, by one of the thrust-bearing apparatuses. Fluid flow through the power section may cause what is commonly referred to as "off-bottom thrust," which may be carried, at least in part, by the other thrust-bearing apparatus. The drilling fluid used to generate the torque for rotating the rotary drill bit exits openings formed in the rotary drill bit and returns to the surface, carrying cuttings of the subterranean formation through an annular space between the drilled borehole and the subterranean drilling system. The drilling fluid may also serve to cool and lubricate the bearing elements of the thrust-bearing apparatus.

The on-bottom and off-bottom thrust carried by the thrust-bearing apparatuses can be extremely large. The operational lifetime of the thrust-bearing apparatuses often determines the useful life of the subterranean drilling system. Therefore, manufacturers and users of subterranean drilling systems continue to seek improved bearing apparatuses and operation methods to extend the useful life of such bearing apparatuses.

SUMMARY

Embodiments of the invention relate to bearing apparatuses in which the bearing apparatus is configured for transferring heat from a lubricating fluid substantially sealed within the bearing apparatus to a drilling fluid (e.g., within the borehole) during use. Use of a lubricating fluid (e.g., oil) separate from the drilling fluid (e.g., drilling mud) provides for significantly increased bearing life as the lubricating oil is less abrasive than drilling fluids typically employed.

In an embodiment, a bearing apparatus for placement into a borehole containing a drilling fluid is disclosed. The bearing apparatus is capable of transferring heat from a lubricating fluid sealed within the bearing apparatus to the drilling fluid within the borehole during use. The bearing apparatus may include a housing having a first end spaced from a second end. The housing may define a substantially sealed enclosure to contain a lubricating fluid at least partially therein. The bearing apparatus may include first and second bearing assemblies, each including a plurality of superhard bearing elements disposed within the housing so as to be exposed to the lubricating fluid during use. The first bearing assembly may be configured to rotate with the rotatable shaft. Each bearing assembly defines a corresponding bearing surface, and the bearing surfaces are oriented so as to be substantially opposed to one another.

The superhard bearing elements may comprise polycrystalline diamond or other superhard material. Providing polycrystalline diamond bearing or other superhard bearing elements in combination with the use of a lubricating fluid provides enhances the durability and operational life of the bearing apparatus. For example, the present inventors have found that hydrodynamic operation of the bearing apparatus may occur at significantly lower revolutions per minute ("RPM") than where conventional drilling fluids (e.g., drilling mud) are used to lubricate the superhard bearing elements. This, in turn, enables systems including such a bearing apparatus to exhibit increased operational life, as the wear on the superhard bearing elements is reduced during typical operation.

In an embodiment, a method of lubricating a bearing apparatus so as to dissipate heat generated during operation of the bearing apparatus is disclosed. A bearing apparatus including a housing and first and second bearing assemblies (e.g., such as those described above) may be provided. The first and second bearing assemblies are rotated relative to one another in the presence of a lubricating fluid. Heat may be generated during operation of the bearing apparatus due to friction at an interface of first and second bearing surfaces of the respective bearing assemblies. The heat generated during operation of the bearing apparatus may be transferred from the superhard bearing elements to the lubricating fluid. The heat may then be transferred from the lubricating fluid to the drilling fluid outside of the housing.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical or similar reference numerals refer to identical or similar elements or features in different views or embodiments shown in the drawings.

DETAILED DESCRIPTION

Embodiments of the invention relate to bearing apparatuses in which the bearing apparatus is configured for transferring heat from a lubricating fluid substantially sealed within the bearing apparatus to a drilling fluid within the shaft, borehole, or both during use. Use of a lubricating fluid (e.g., oil) separate from the drilling fluid (e.g., drilling mud) provides for increased bearing life as the lubricating oil is less abrasive than drilling fluids typically employed. In addition, hydrodynamic operation may be achievable at significantly lower RPM than with typical drilling fluids. For example, while hydrodynamic operation may be possible between about 500 RPM and about 1000 RPM when lubricating with typical drilling mud or water, hydrodynamic operation may occur as low as 100 RPM to about 250 RPM when employing an alternative lubricating fluid that is substantially sealed within the bearing apparatus. In other words, in an embodiment, hydrodynamic operation may occur at revolution rates of about 100 RPM and greater. In another embodiment, hydrodynamic operation may occur at revolution rates of about 250 RPM or greater. Heat removed from the bearings by the lubricating fluid may then be transferred to the drilling fluid through the sealed housing of the bearing apparatus. Thus, the drilling fluid (e.g., drilling mud) may be used to cool the lubricating oil within the oil-lubricated superhard bearing assembly.

Hydrodynamic operation describes a condition in which a fluid film develops between the bearing surfaces of the first and second bearing assemblies. Mixed-mode lubrication may describe partial fluid-film development where there may still be some asperity contact between opposing bearing surfaces. The fluid film may not necessarily extend completely over the opposed bearing surfaces. For example, the term "hydrodynamic operation," as used herein, is to be construed broadly, so as to include mixed-mode operation regimes where the fluid film partially extends over these surfaces (e.g., at least about 50%). Such a fluid film may extend over at least about 50%, at least about 75%, at least about 90%, or at least about 95% of the surface area of the bearing surfaces.

The fluid film helps limit (e.g., prevent) contact between the bearing surfaces of the rotor and stator. Hydrodynamic operation of the bearing apparatus is characterized by lowered friction, decreased heat generation, and increased operation life of the superhard bearing elements. In other words, the fluid film may help prevent or limit contact between the opposing bearing surfaces of the first and second bearing assemblies. Such a fluid film may significantly reduce friction and heat generation, extending the operation life of the bearing elements.

Figure 1A:
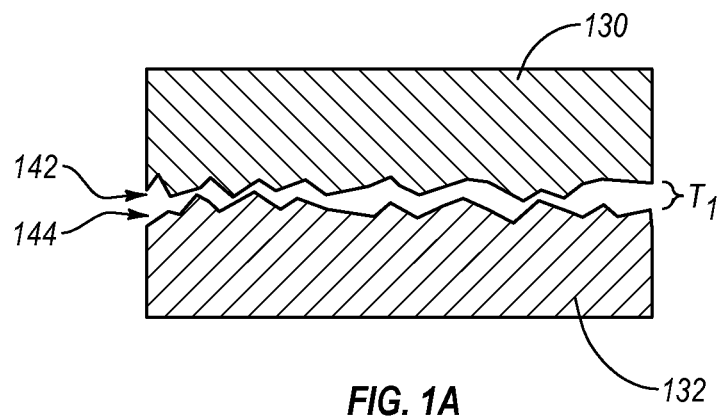
FIGS. 1A-1C schematically show the effect of fluid film thickness on bearing operation.
Figure 1B:
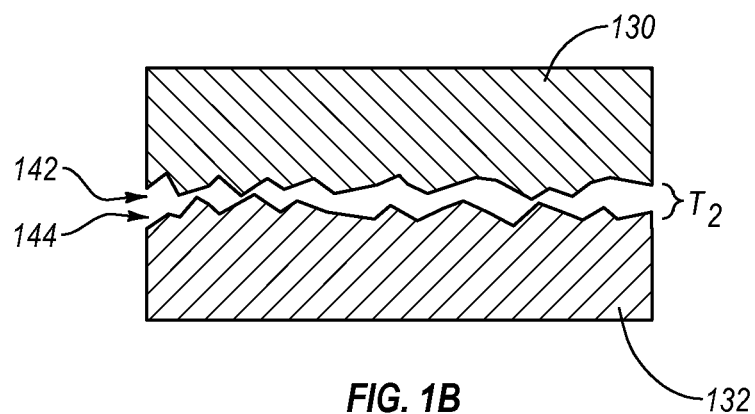
Figure 1C:
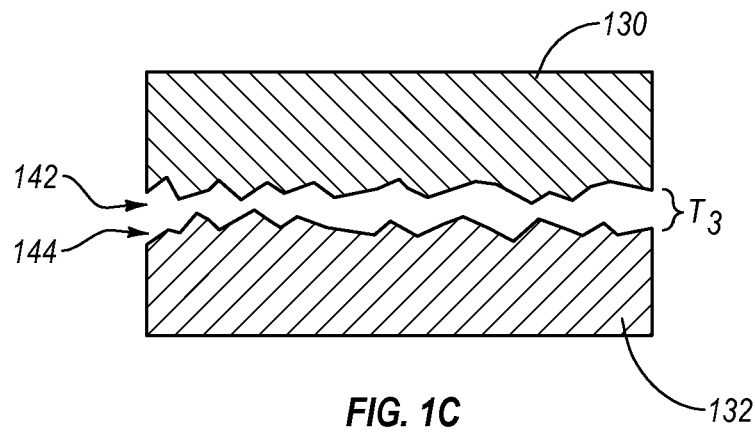

FIGS. 1A-1C schematically show the effect of fluid film thickness on bearing operation. FIG. 1A shows superhard bearing elements 130, 132 with a relatively thin fluid film $T_1$ therebetween. Where film thickness $T_1$ is insufficient, the asperities due to microscopic surface roughness may result in rubbing contact and shear between bearing surfaces 142 and 144. FIG. 1B shows superhard bearing elements 130, 132 with a relatively thicker fluid film $T_2$ therebetween, which results in less shear than would result from FIG. 1A. FIG. 1C shows superhard bearing elements 130, 132 with a fluid film thickness $T_3$ therebetween. $T_3$ is sufficiently large so that no direct contact occurs between bearing surfaces 142, 144. Providing a film thickness that is sufficiently large (e.g., as shown in FIG. 1C) may allow for relatively cooler temperature and higher viscosity within the lubricating fluid, and less resulting wear to bearing surfaces 142, 144. In an embodiment, the fluid film may have a thickness from about 1 µm to about 20 µm, from about 2 µm to about 15 µm, or from about 4 µm to about 12 µm.

Figure 2A:
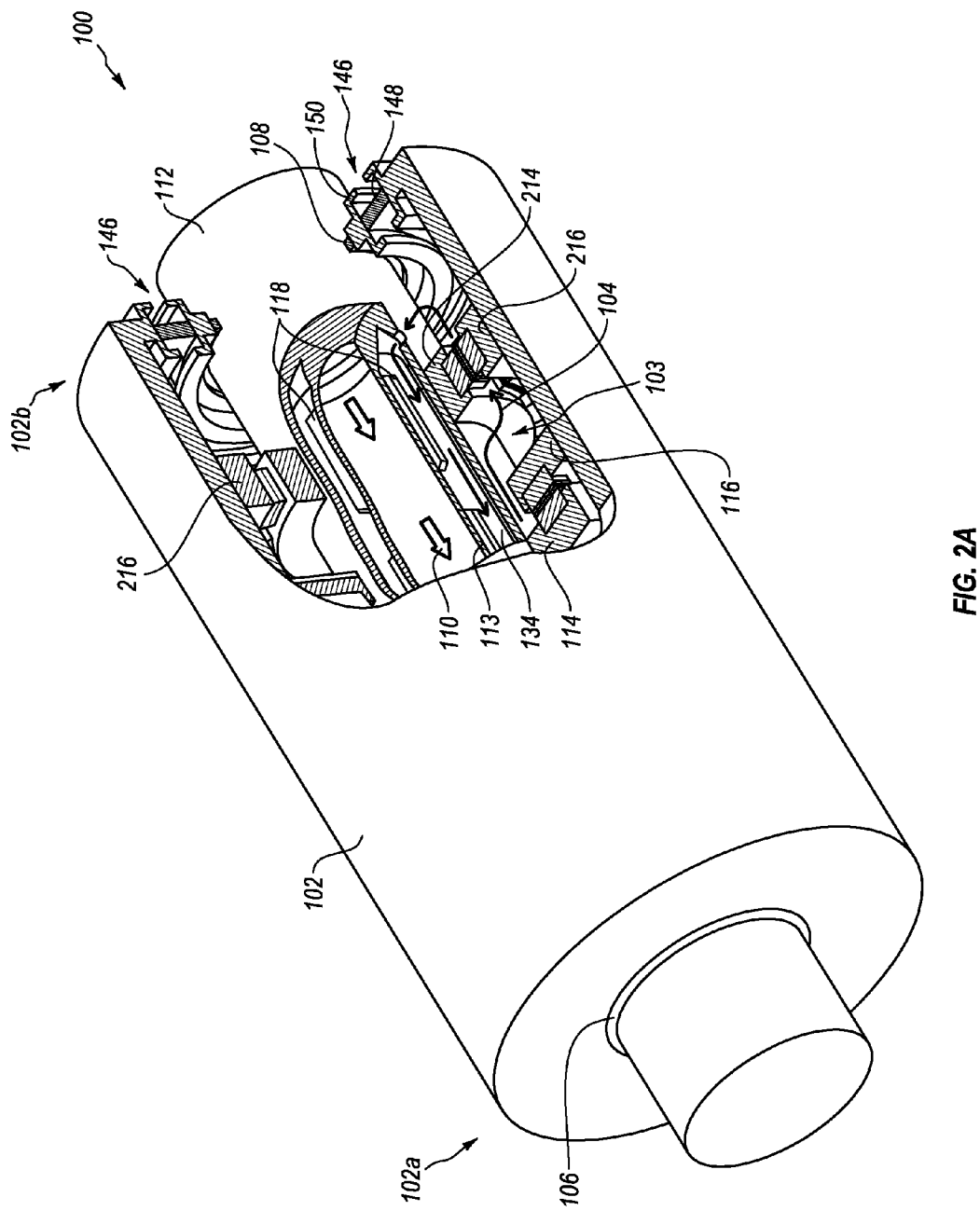
FIG. 2A is an isometric cutaway view of an embodiment of a bearing apparatus with a portion thereof cut away to show interior components.
Figure 2B:
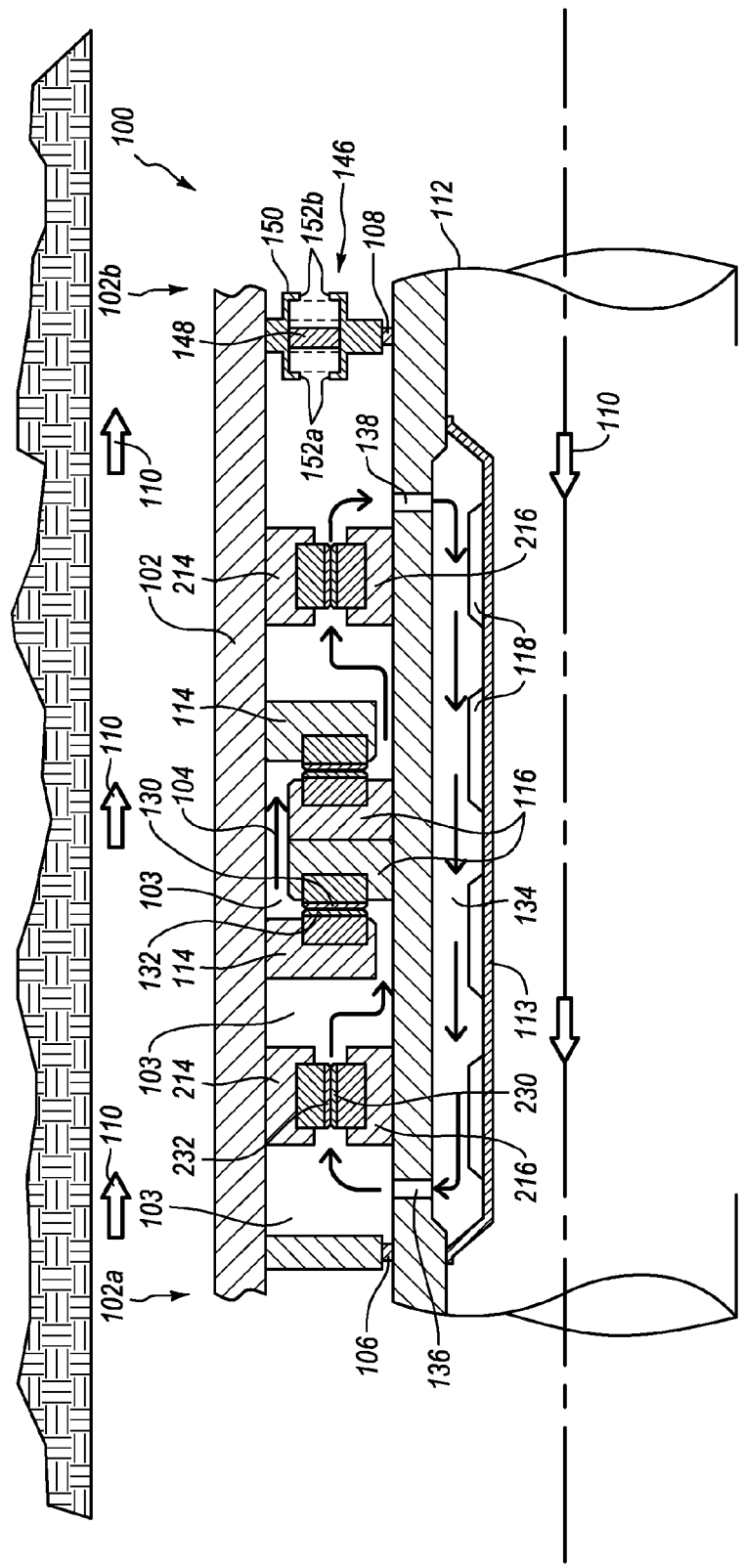
FIG. 2B is a cross-sectional view of the bearing apparatus shown in FIG. 2A.

As shown in FIGS. 2A and 2B, an embodiment of a bearing apparatus 100 may include a housing 102 having a first end 102*a* spaced from a second end 102*b*. Housing 102 may be substantially sealed to define a lubrication circulation region 103 configured to contain a lubricating fluid 104 therein. Region 103 of housing 102 is substantially sealed to prevent contact between lubricating fluid 104 and drilling fluid 110, which might otherwise result in contamination of lubricating fluid 104. For example, bearing apparatus 100 may comprise first seal 106 and second seal 108 configured to form a substantially fluid-tight connection between a corresponding end of housing 102 and rotatable shaft 112 that rotates relative to housing 102. First and second seals 106 and 108, respectively, are configured to substantially seal lubricating fluid 104 within housing 102 in order to seal lubricating fluid 104 within region 103, where it is circulated between the various bearing surfaces and into heat exchanging relationship with drilling fluid 110 running down through shaft 112, and finally recirculated through region 103 again. In an embodiment, seals 106 and 108 may comprise o-ring seals, sealing packings, sealing washers, mechanical face seals, other seals, or combinations thereof.

Figure 3A:
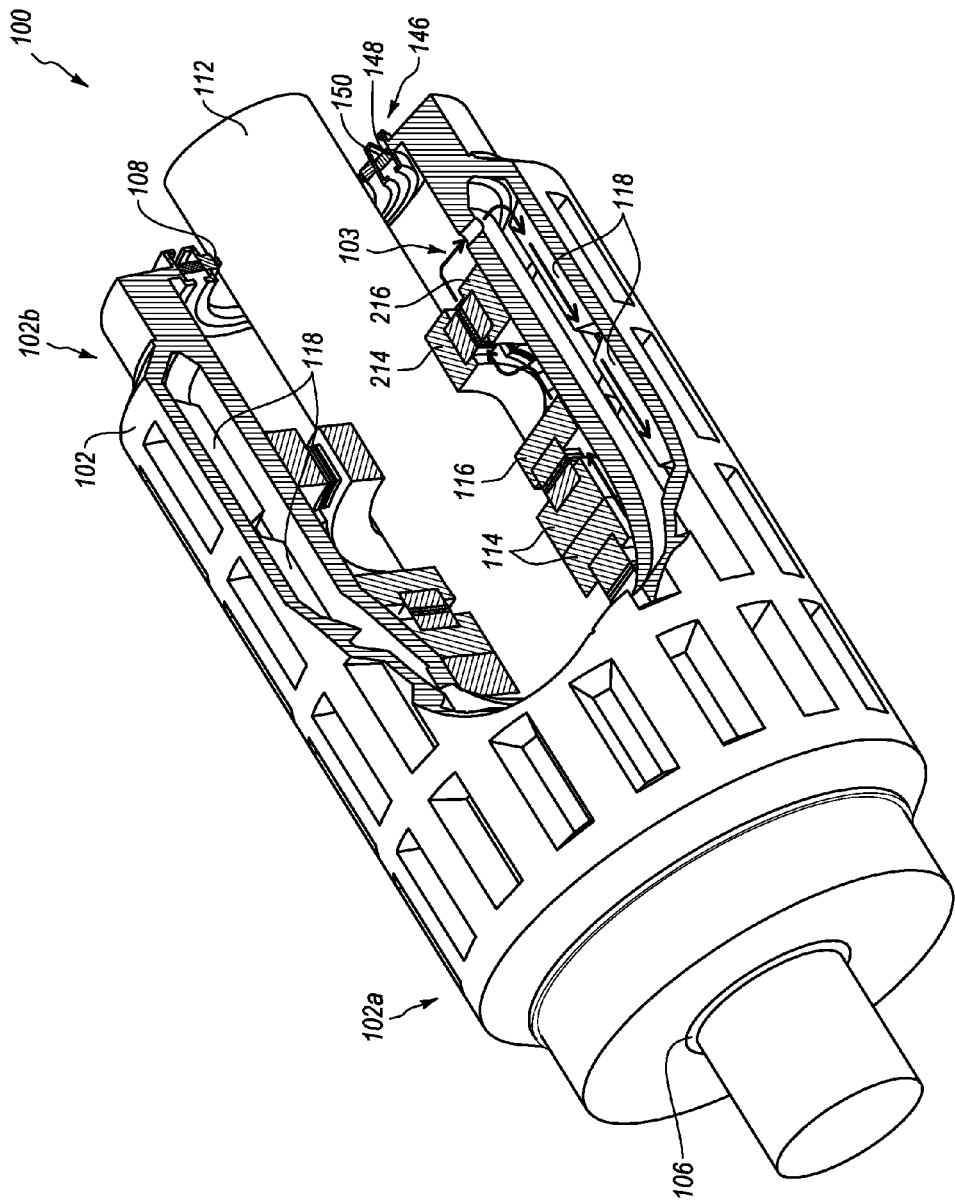
FIG. 3A is an isometric view of another embodiment of a bearing apparatus with a portion thereof cut away to show interior components.
Figure 3B:
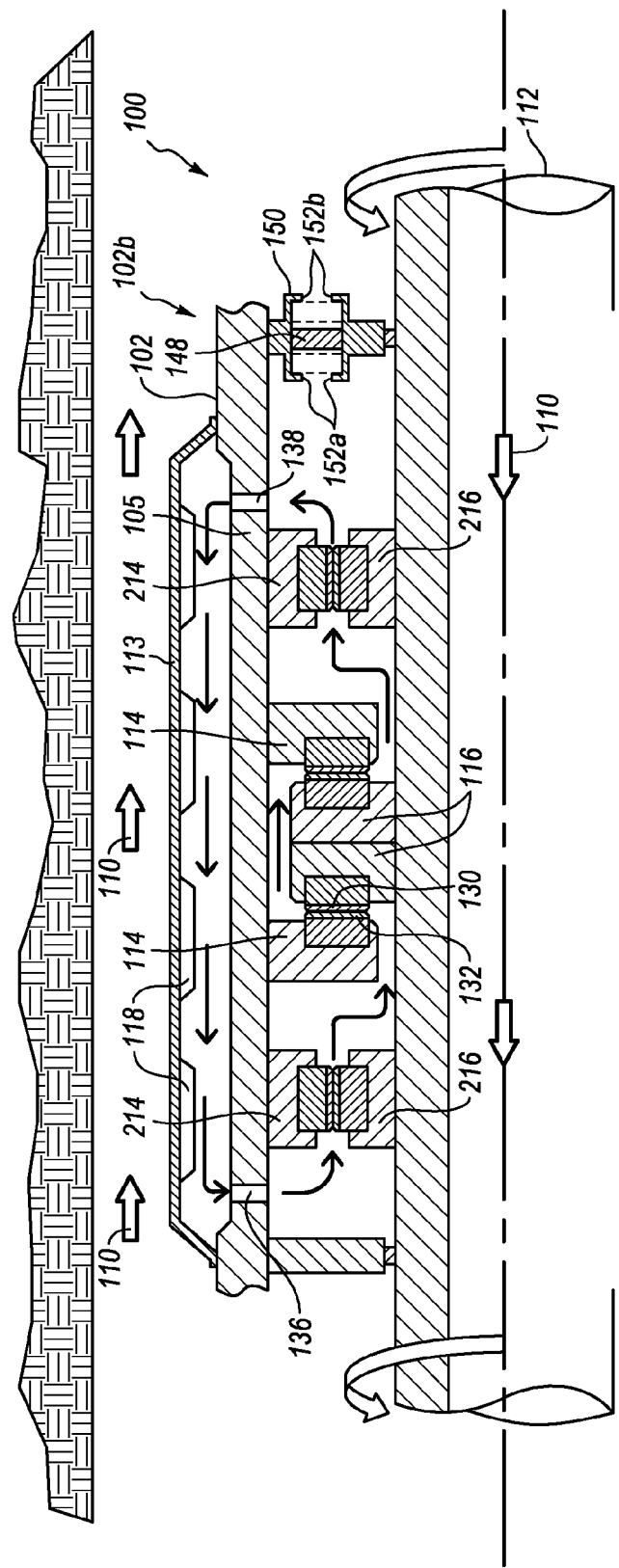
FIG. 3B is a cross-sectional view of the bearing apparatus shown in FIG. 3A.

Drilling fluid 110 may be introduced into the borehole through shaft 112 (separated from lubricating fluid 104) so as to travel downward to a rotary or other drill bit (not shown) at a distal end of shaft 112. Once drilling fluid exits through the drill bit, drilling fluid 110 may pass upwardly through the borehole. The drilling fluid 110 may be used to cause rotation of shaft 112 through a turbine mechanism or other rotation mechanism that is not shown. FIGS. 2A and 2B show an embodiment in which heat is transferred from lubricating fluid 104 to drilling fluid 110 (i.e., through shaft 112) as fluid 110 moves downward through shaft 112. FIGS. 3A and 3B show an another embodiment in which heat is transferred from lubricating fluid 104 to drilling fluid 110 (i.e., through housing 102) as fluid 110 moves upward through the borehole.

Such substantially sealed configurations facilitate the use of a lubricating fluid with greater performance characteristics as compared to performance characteristics associated with typical drilling fluids, such as water, drilling mud or air. Lubricating fluid 104 may demonstrate improvements over the typical drilling fluids in characteristics such as, but not limited to, lower abrasivity, viscosity, higher thermal stability, a lower hydrodynamic threshold, and combinations of the foregoing.

In an embodiment, bearing apparatus 100 may further include a mechanism for compensating for a pressure differential between drilling fluid 110 exterior to housing 102 and lubricating fluid 104 sealed within housing 102. For example, a pressure compensating assembly 146 may be provided within housing 102, between lubricating fluid 104 and drilling fluid 110. Pressure compensating assembly 146 may include a piston member 148 (e.g., a circular ring or other moveable member such as a flexible bladder or membrane) received within a cage 150 comprising oppositely disposed lateral extension stops 152*a* and 152*b* (FIG. 2B). As shown in FIG. 2B, piston member 148 may be free to move between positions adjacent stops 152*a* and 152*b*, depending on the relative pressures of lubricating fluid 104 and drilling fluid 110 traveling upward within the borehole. A similar pressure compensation mechanism may be provided for compensating for a pressure differential between fluid 104 and drilling fluid 110 traveling downward within shaft 112.

Where drilling fluid 110 and lubricating fluid 104 are at approximately the same pressure, piston member 148 may reside approximately equidistant between stops 152*a* and 152*b* (e.g., centered with the adjacent housing wall as shown in FIG. 2A). Where drilling fluid 110 is at a relatively higher pressure than lubricating fluid 104, piston member 148 may move towards stop 152*a*, further within housing 102. Where drilling fluid 110 is at a relatively lower pressure than lubricating fluid 104, piston member 148 may move towards stop 152*b*.

The ability to compensate for pressure differences between drilling fluid and lubricating fluid 104 aids in managing friction of primary seals 106 and 108 so as to increase the life of such seals. In an embodiment, one or more of primary seals 106 or 108 may be housed within a cage (e.g., similar to cage 150), so as to allow one or more of seals 106 or 108 to move so as to compensate for a pressure differential. While FIGS. 2A and 2B show an embodiment of a pressure compensation mechanism, the illustrated embodiment is only an example, and it will be understood that other mechanisms may be employed or the pressure compensation mechanism may be omitted.

Referring to FIGS. 2A and 2B, bearing apparatus 100 includes first bearing assembly 114 and second bearing assembly 116, each including a plurality of superhard bearing elements, disposed within housing 102 so as to be lubricated by lubricating fluid 104. First bearing assembly 114 may be fixed relative to housing 102, while second bearing assembly 116 may be fixed relative to rotatable shaft 112. In an embodiment, first bearing assembly 114 is configured as a rotor and the second bearing assembly 116 is configured as a stator. The configuration illustrated in FIGS. 2A and 2B includes two sets of thrust bearing assemblies 114, 116, as well as two sets of radial bearing assemblies 214 and 216.

In an embodiment, housing 102, shaft 112, or both may include one or more cooling elements to better facilitate the transfer of heat from lubricating fluid 104 to drilling fluid 110. For example, such cooling elements may include, but are not limited to, fins, pipes, grates, wires, rods, or any combination thereof. FIGS. 2A and 2B show fins 118 disposed within cavity 134, inwardly oriented to impinge upon flow of lubricating fluid 104, increasing a transfer rate of heat from lubricating fluid 104 to drilling fluid 110. Additional examples of such cooling elements are shown in FIGS. 4-9A.

Such cooling elements may be disposed such that the one or more cooling elements increase the effective surface area of housing 102, shaft 112, or both in order to enhance heat transfer between lubricating fluid 104 and drilling fluid 110. In an embodiment, such cooling elements may be disposed so as to extend outwardly, inwardly, or both, relative to housing 102, shaft 112, or both. FIGS. 2A and 2B show an embodiment including cooling fins 118, which facilitate heat transfer between lubricating fluid 104 and drilling fluid 110 by enabling flow of lubricating fluid 104 through a high surface-area-to-volume ratio region within cavity 134 separated from drilling fluid 110 by separation sleeve 113. Fins 118 may be formed in separation sleeve 113, as shown. Fins may inwardly extend into cavity 134, as shown. For example, as illustrated lubricating fluid 104 may flow between fins 118 providing increased surface area for transfer of heat between fluid 104 and fluid 110. While fins 118 are shown as extending inwardly relative to cavity 134, it will be understood that another configuration may be employed in which the fins are oppositely oriented, e.g., fins 118 may extend into shaft 112 so as to impinge on flow of fluid 110 within shaft 112.

FIGS. 3A and 3B show another embodiment in which fins 118 are disposed on an exterior surface of housing 102, inwardly oriented so that lubricating fluid 104 flows between fins 118, while upwardly flowing drilling fluid 110 flows along the exterior of housing 102, transferring heat from lubricating fluid 104 to drilling fluid 110.

Figure 4:
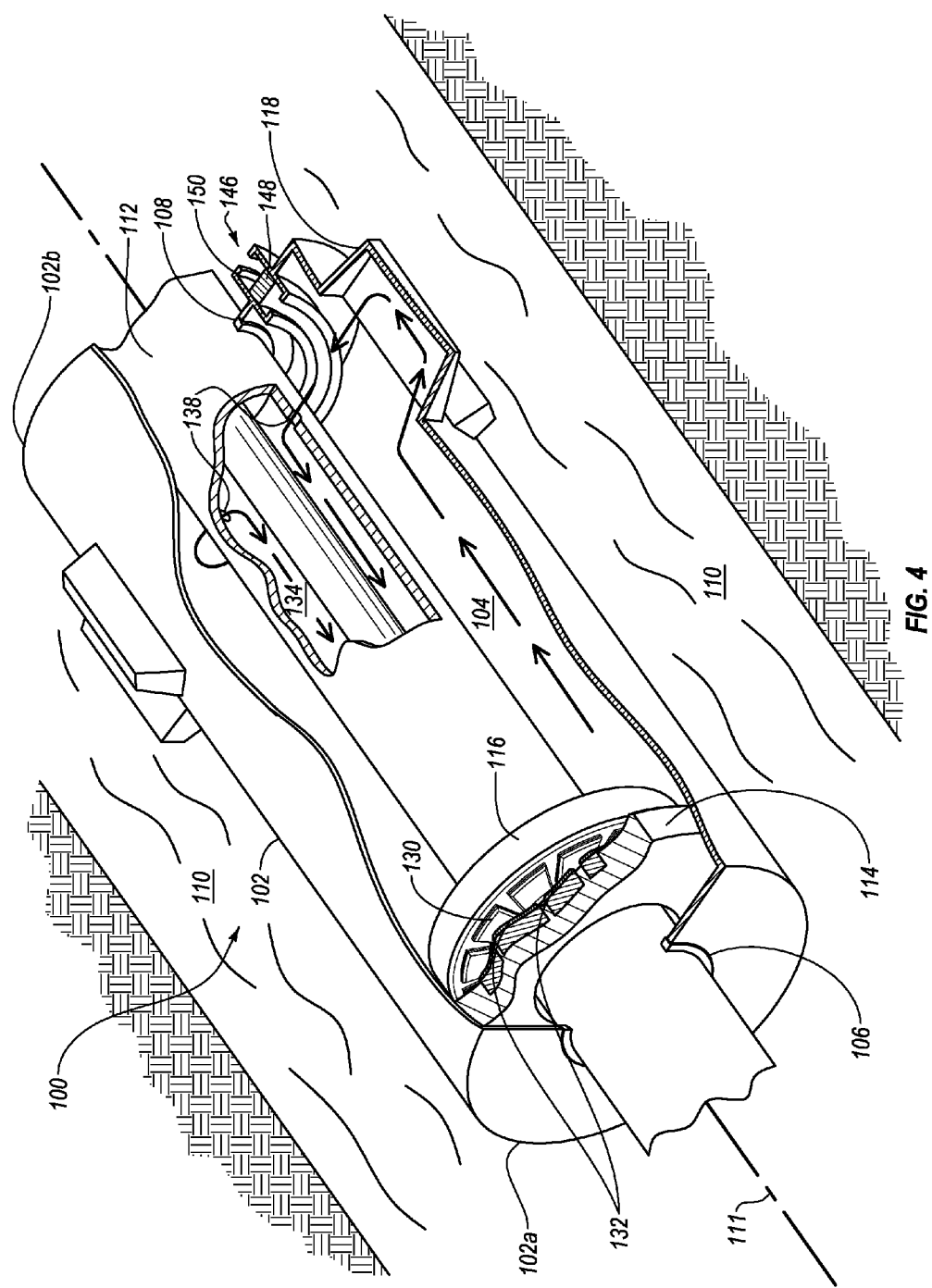
FIG. 4 is a simplified isometric cutaway view of another embodiment of a bearing apparatus with a portion thereof cut away to view the interior components.
Figure 5:
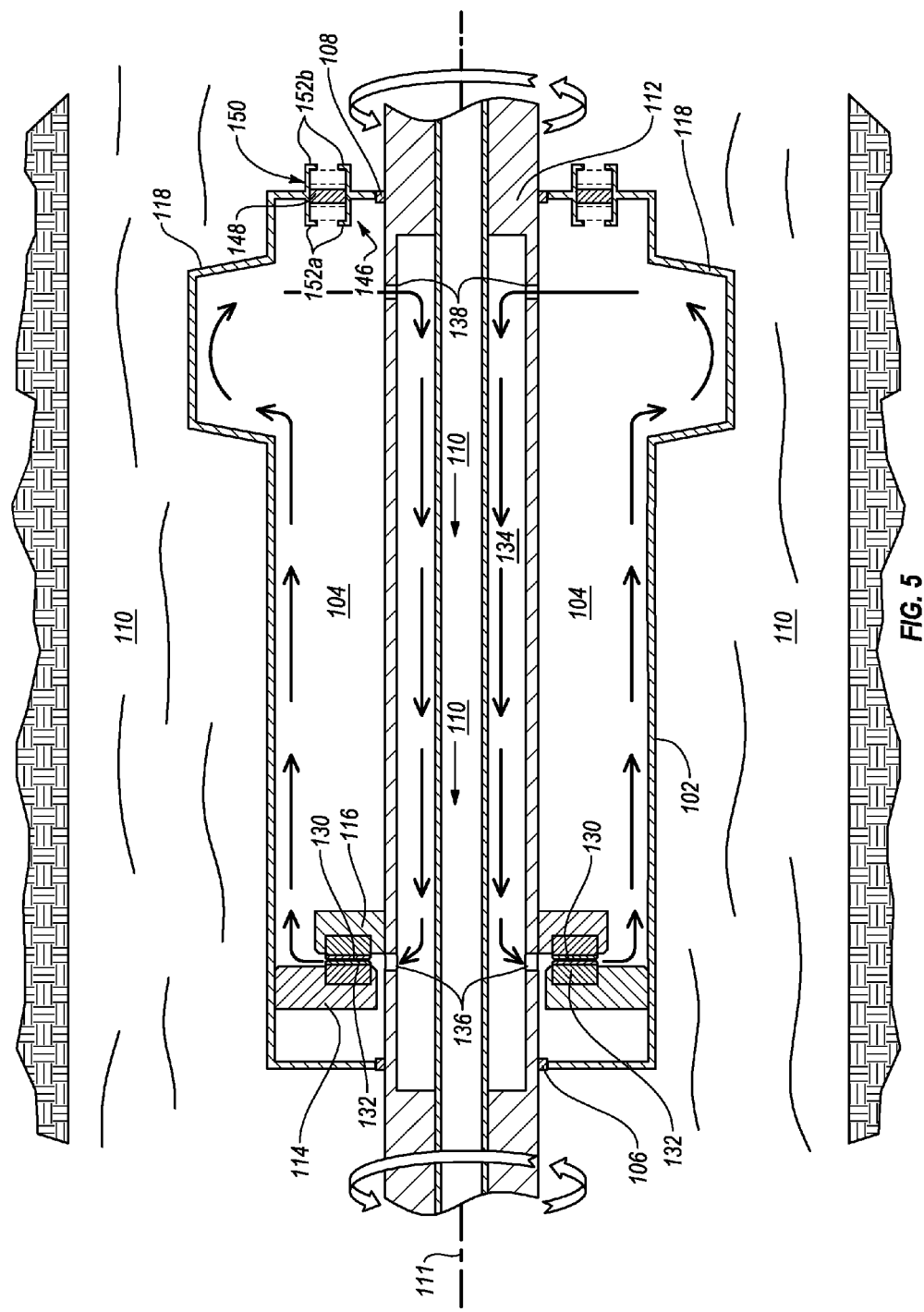
FIG. 5 is a cross-sectional view of the bearing apparatus shown in FIG. 4.

FIGS. 4-9A show simplified configurations to illustrate various cooling elements and other features. For example, FIGS. 4 and 5 show a configuration in which fins 118 are disposed on an exterior surface of housing 102, outwardly oriented so as to impinge on flow of drilling fluid 110 as it moves upwardly within the borehole.

Figure 6:
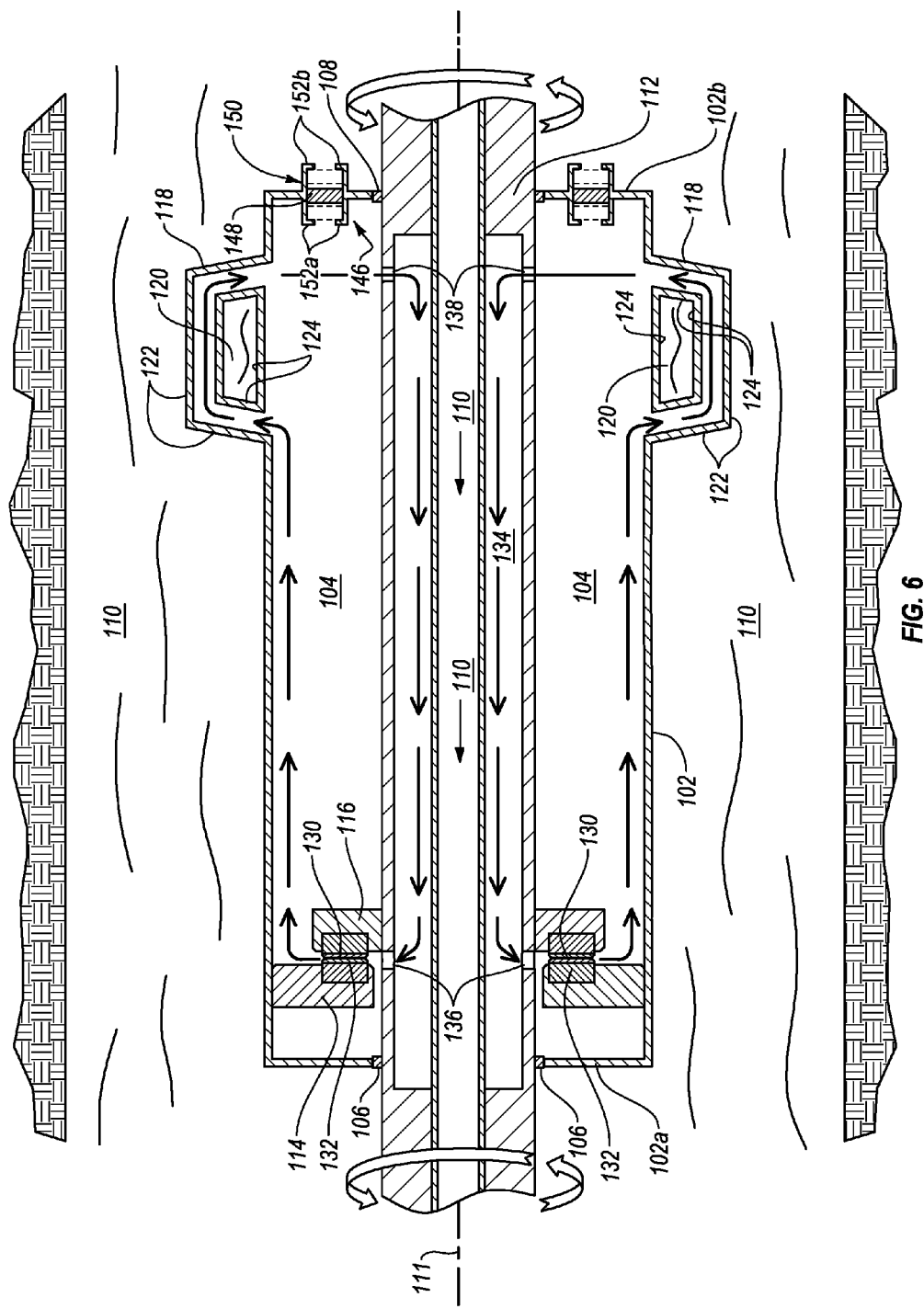
FIG. 6 is a cross-sectional view of a bearing apparatus having cooling fins according to another embodiment.

FIG. 6 depicts another embodiment that includes solid fins, pins, grooves, or other geometric features to facilitate heat transfer (e.g., convection) in which cooling fins 118 may include a transverse channel 120 therethrough through which drilling fluid 110 may flow, so as to allow for heat transfer to occur not only at surface 122 of fin 118, but also along surface 124, adjacent channel 120. Such a configuration may increase heat transfer between lubricating fluid 104 and drilling fluid 110 in comparison to the fin configurations shown in FIGS. 4 and 5.

Figure 7:
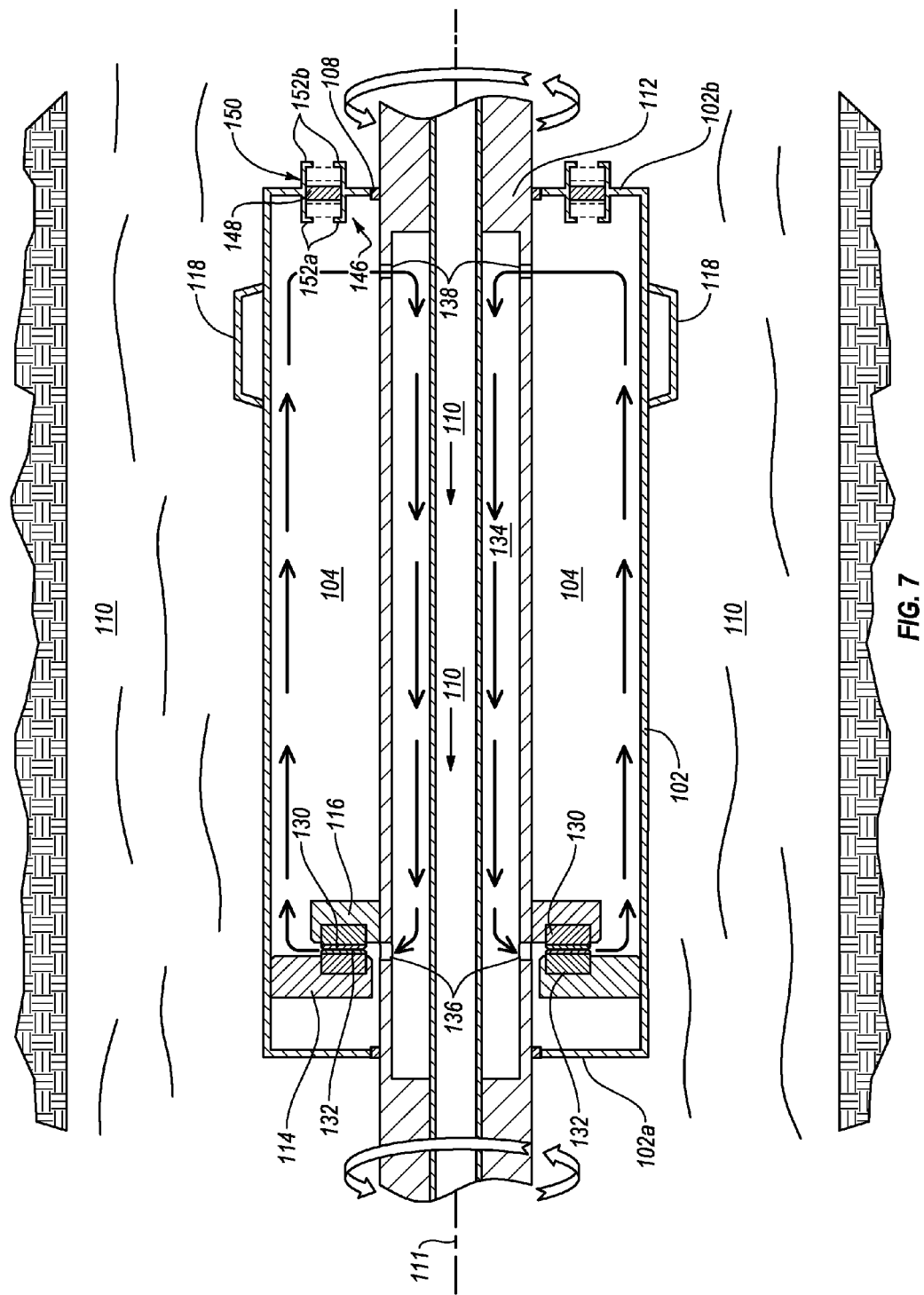
FIG. 7 is a cross-sectional view of a bearing apparatus having cooling fins according to yet another embodiment.

FIG. 7 shows another fin configuration, in which the inside of fins 118 are not in fluid communication with lubricating fluid 104, so that lubricating fluid 104 does not enter fins 118. Rather, heat is transferred through housing 102 to fins 118. A wide variety of fin configurations may be possible, any of which may provide suitable heat transfer from lubricating fluid 104 to drilling fluid 110 as compared to an embodiment including no cooling element at all (e.g., an embodiment including housing 102 without fins 118).

Figure 8:
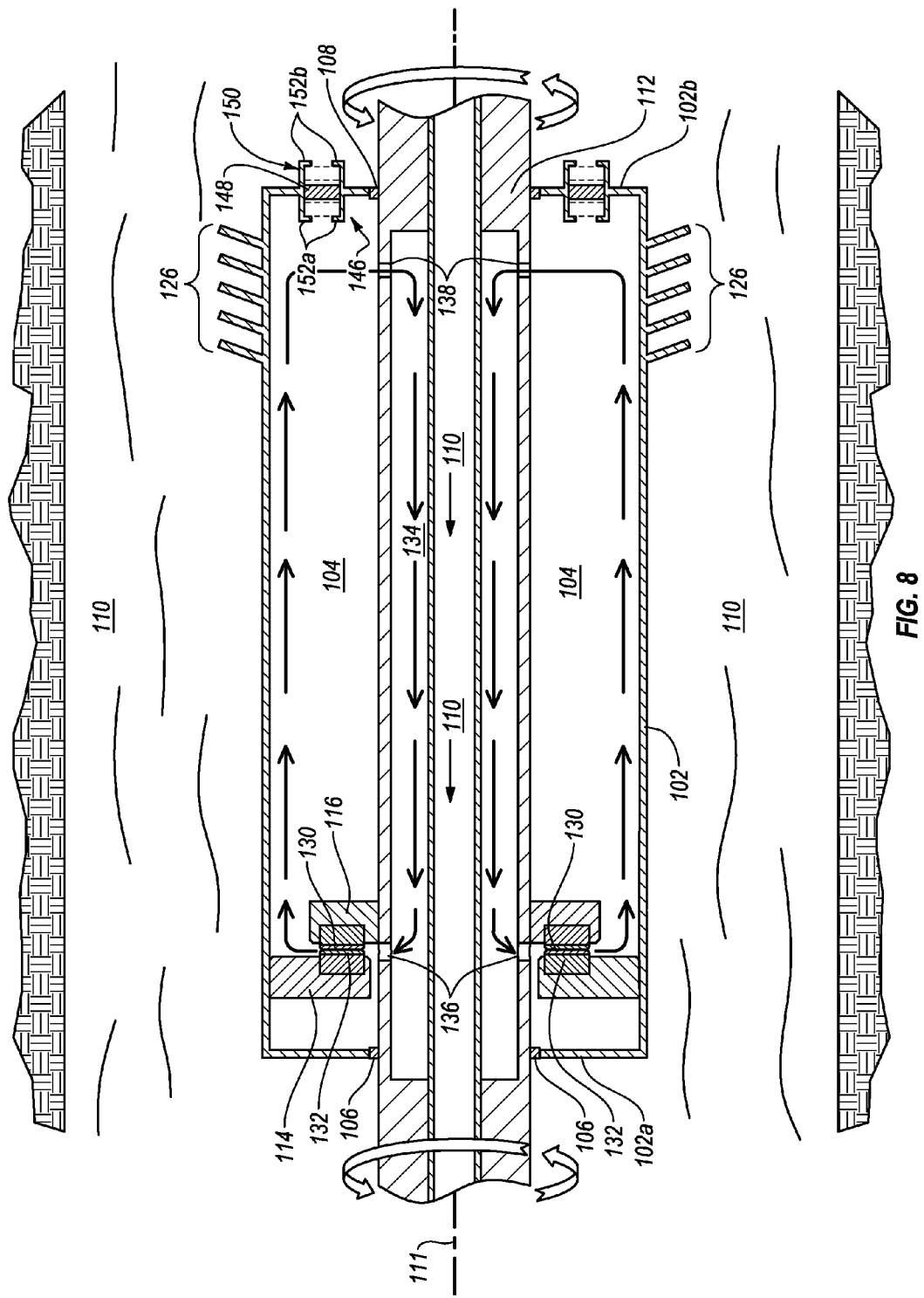
FIG. 8 is a cross-sectional view of a bearing apparatus having cooling fins according to a further embodiment.

FIG. 8 shows yet another embodiment including a plurality of fins 126 that are oriented differently than fins 118 of the embodiments of FIGS. 4-7. For example, fins 118 of the embodiments shown in FIGS. 4-7 are generally oriented so that a plane defined by fin 118 is aligned with a longitudinal axis of bearing apparatus 100. The major surface area of fins 126 of the embodiment shown in FIG. 8 is oriented with a plane that extends transverse to a longitudinal axis 111. In other words, fins 126 may extend in a direction that is transverse to the adjacent portion of housing 102. As shown, fins 126 may be angled rearwardly or forwardly relative to a direction of applied thrust, so that the free end of each fin 126 is angled rearwardly or forwardly relative to the direction of applied thrust.

Figure 9:
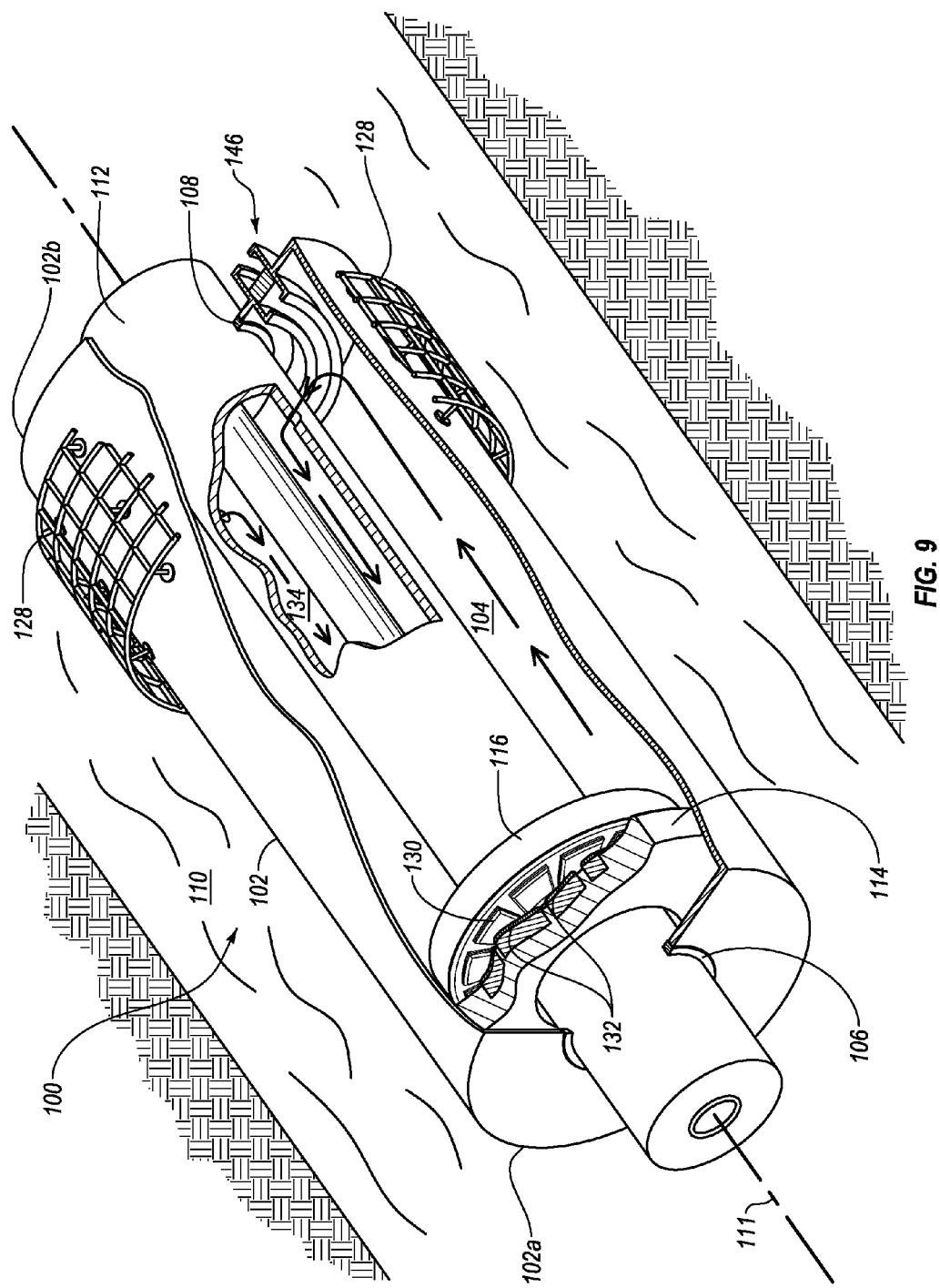
FIG. 9 is an isometric view of a bearing apparatus having a cooling mesh according to an embodiment.

FIG. 9 shows another configuration including a cooling element comprising a mesh 128 for increasing the effective surface area of the housing 102 in contact with drilling fluid 110 by convection. Mesh 128 may be in thermal contact with housing 102, so as to facilitate transfer of heat from housing 102 into mesh 128, where it may be transferred to drilling fluid 110. Thus, heat generated from superhard bearing elements 130 and 132 is drawn away from superhard bearing elements 130, 132 and associated bearing assemblies 114, 116 into lubricating fluid 104. Lubricating fluid 104 circulates within housing 102, so that heat is transferred from fluid 104 to housing 102, where it can be dissipated from housing 102 and any included cooling elements (e.g., fins, a cooling mesh, etc.) into drilling fluid 110. Circulation may be facilitated by use of a pump and/or pumping action provided by shaft 112 and bearing assemblies 114, 116. In one embodiment, pumping action is provided by rotatable shaft 112 and bearing assemblies 114, 116 so that no further pump is needed.

Cooling elements such as fins 118, 126 or cooling mesh 128 may facilitate the heat transfer process in several ways. First, the cooling elements may increase the effective surface area of housing 102 in contact with lubricating fluid 104 and/or drilling fluid 110. This increase in surface area in contact with drilling fluid 110 allows heat to be transferred more rapidly from housing 102 to drilling fluid 110. Some embodiments of the bearing apparatus 100 shown in FIG. 9 may increase the effective surface area of housing 102 in contact with lubricating fluid 104 such as shown in FIG. 6. Increasing the surface area in contact with lubricating fluid 104 may allow for more rapid transfer of heat from lubricating fluid 104 to housing 102.

In addition to heat exchange features included in housing 102 shaft 112, or both, various other heat exchanger configurations (e.g., plate/fin, shell/tube, spiral, etc.) may be employed to facilitate transfer of heat between drilling fluid 110 and lubricating fluid 104. Such heat exchanger configurations may be incorporated with housing 102, shaft 112, or an external heat exchanger may be provided to transfer heat from lubricating fluid 104. Once heat is transferred from lubricating fluid 104, fluid 104 may be recirculated through bearing assemblies 114, 116.

Returning now to FIGS. 2A and 2B, the operation of bearing apparatus 100 will be described in more detail. However, it should be noted that the circulation features for circulating lubricating fluid in bearing apparatus 100 may be employed in any of the bearing apparatuses disclosed herein that circulate lubricating fluid. Rotatable shaft 112 may further comprise one or more circulation cavities 134 through which lubricating fluid 104 may flow. In an embodiment, circulation cavity 134 may be substantially enclosed, separated from downwardly directed drilling fluid 110 by separation sleeve 113. Circulation cavity 134 facilitates circulation of lubricating fluid 104 through bearing assemblies 114, 116, 214, 216 in housing 102 and into cavity 134 for heat transfer (i.e., cooling) and recirculation. For example, as shown by the circulation flow arrows, lubricating fluid 104 within cavity 134 may be pulled (or pushed) into circulation holes 136 adjacent end 102a by rotation of shaft 112/bearing assemblies, directing fluid 104 into bearing assemblies 214, 216, 114, 116. Lubricating fluid 104 lubricates superhard bearing elements 230, 232, 130, 132, of the various bearing assemblies. Near end 102b, lubricating fluid 104 reenters cavity 134 through hole 138 adjacent end 102b and is conveyed lengthwise in cavity 134 along separation sleeve 113 and fins 118, where heat may be transferred into drilling fluid 110. Adjacent seal 106, lubricating fluid 104 may again be drawn, pushed, or otherwise directed into region 103 through hole 136.

Circulation region 103 and circulation cavity 134 may extend approximately the entire length of housing 102. While illustrated with an internal, enclosed hollow circulation cavity 134, it will be understood that other shaft configurations may be possible. For example, in another embodiment, circulation cavities may be configured as recessed channels or tunnels (e.g., disposed around a periphery of shaft 112.

Circulation holes 136 and 138 provide fluid communication so as to allow circulation of lubricating fluid 104 between the circulation cavity 134 and region 103 within housing 102, adjacent bearing assemblies 114, 116. In an embodiment, circulation holes 138 allow lubricating fluid 104 to enter circulation cavity 134 and flow from one end (e.g., 102b) of housing 102, towards second end 102a of housing 102, where holes 136 allow reentry into region 103 for lubrication of bearing assemblies 114, 116, 214, 216. Circulation holes 136, 138 may be oriented normal to the exterior surface of rotatable shaft 112 (i.e., radially) (FIG. 2B) or housing wall 105 separating cavity 134 from region 103 (FIG. 3B). In another embodiment, one or more of circulation holes 136, 138 may be oriented to meet the surface of rotatable shaft 112 (or wall 105) at a non-normal angle.

Figure 9A:
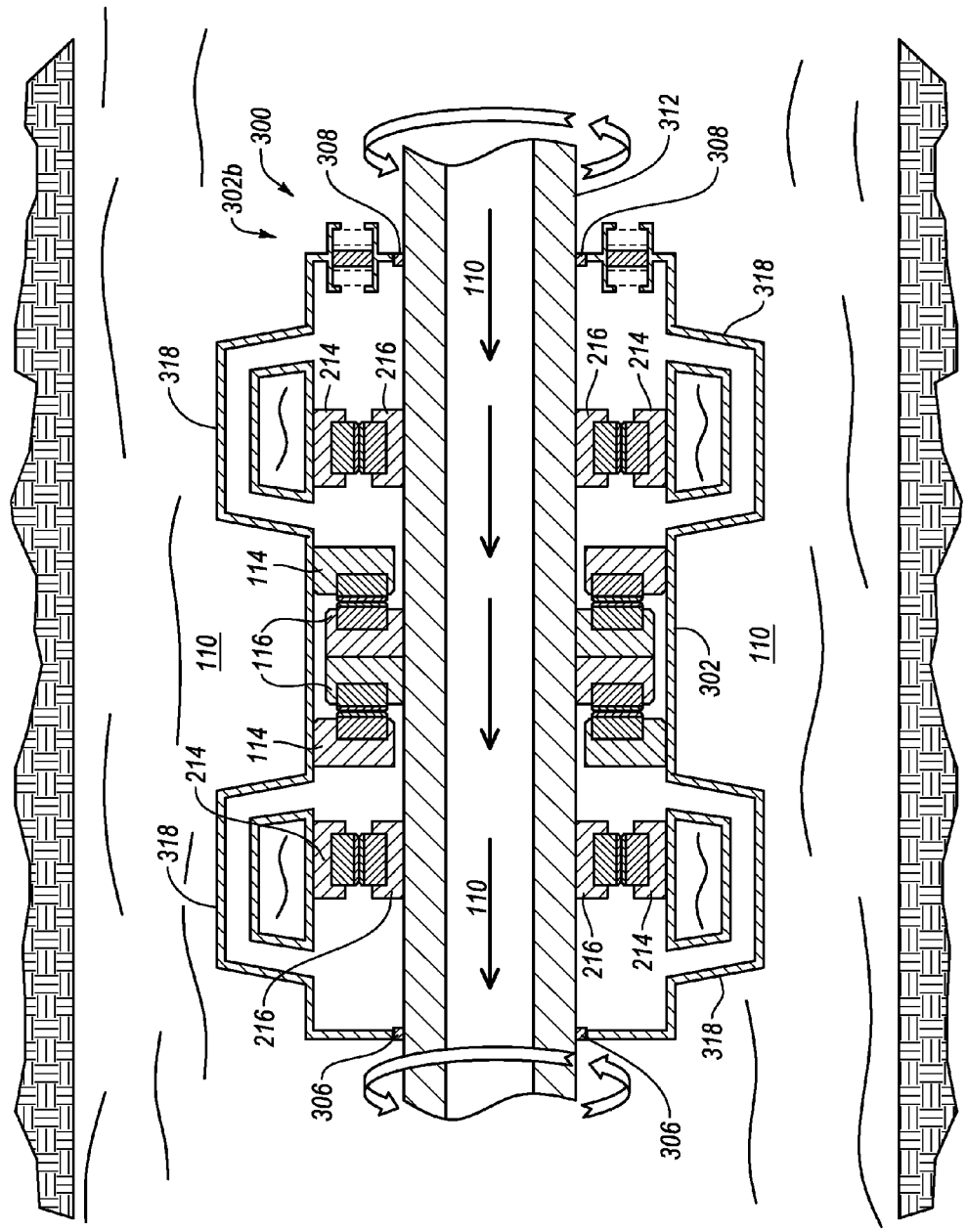
FIG. 9A is a cross-sectional view of a bearing apparatus according to another embodiment.

FIG. 9A shows another embodiment, using a simplified schematic, showing a sealed bearing apparatus 300 including a housing 302 having a first end 302a spaced from a second end 302b. Housing 302 may be substantially sealed (e.g., seals 306 and 308) to contain a lubricating fluid therein. As shown, the lubricating fluid may not be forced to circulate through an outer or inner circulation cavity such as cavity 134. Sealing of housing 302 prevents contact between the lubricating fluid and drilling fluid 110 that drives rotation of shaft 312, which might otherwise result in contamination of the lubricating fluid. Heat is transferred from lubricating fluid 104 to drilling fluid 110 primarily through fins 318. Bearing apparatus 300 is shown including first and second radial bearing assemblies 214 and 216, each including a plurality of superhard bearing elements lubricated by the lubricating fluid within housing 302. One or more of the features shown in FIGS. 2A-3B may be optionally included in the embodiment shown in FIG. 9A. Radial bearing assembly 214 (a stator) may be fixed relative to housing 302, while second radial bearing assembly 216 (a rotor) may rotate with rotatable shaft 312. As shown, two of each of radial bearing assemblies 214, 216 may be provided (e.g., a set adjacent each end of housing 302). Heat may be drawn away from the thrust bearing assemblies and radial bearing assemblies into the lubricating fluid. The heat may thereafter be transferred through housing 302 into drilling fluid 110. Bearing apparatus 300 may include any of the cooling elements (e.g., fins 318) described above. Such cooling elements may be provided on the interior of housing 302, the exterior of housing 302, or both. Similarly, mixing feature structures as described herein may extend from one or more of the bearing assemblies or shaft 312 within housing 302 to facilitate circulation of the lubricating fluid.

Figure 10:
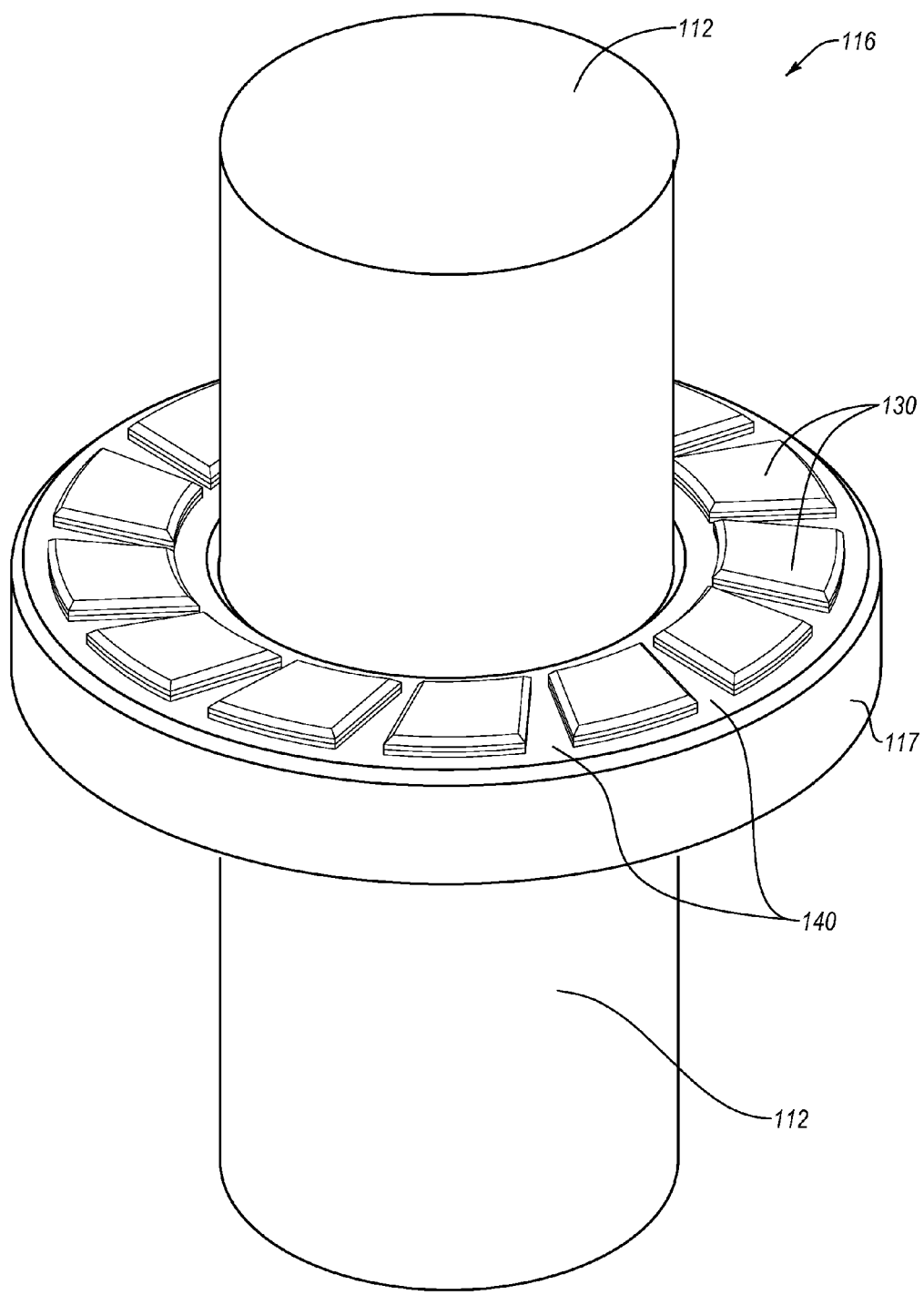
FIG. 10 is an isometric view of a thrust-bearing assembly according to an embodiment.

FIG. 10 is a close-up view of a thrust rotor bearing assembly 116 (e.g., of FIGS. 2A-9A) according to an embodiment. Rotor bearing assembly 116 includes a plurality of superhard bearing elements 130 disposed circumferentially around rotatable shaft 112. The superhard bearing elements may be disposed on a support ring 117. Superhard bearing elements 130 may advantageously comprise a superhard material. As used herein, a superhard bearing element is a bearing element including a bearing surface that is made from a material exhibiting a hardness that is at least as hard as tungsten carbide. Examples of superhard materials for use in as bearing materials for any of the superhard bearing elements disclosed herein include, but are not limited to, polycrystalline diamond ("PCD"), polycrystalline cubic boron nitride, silicon carbide, tungsten carbide, or any combination of the foregoing. The PCD comprises a plurality of bonded diamond grains defining a plurality of interstitial regions therebetween. The individual bonded diamond grains may be sintered together with the aid of a metal-solvent catalyst (e.g., cobalt, nickel, iron, or combinations thereof).

Typical PCD elements may be formed in a high-pressure/high-temperature ("HPHT") process in which a volume of diamond particles is placed with a metal-solvent catalyst (e.g., typically cobalt or nickel) into a container or cartridge. The metal-solvent catalyst may be provided in the form of a metal-solvent catalyst-cemented carbide (e.g., cobalt cemented tungsten carbide) substrate to which a PCD element is to be bonded. When a substrate is employed, the substrate and volume of diamond particles are processed under HPHT conditions in the presence of the metal-solvent catalyst that causes the diamond particles to bond to one another to form a matrix of bonded diamond grains defining a PCD element.

The cobalt or other metal-solvent catalyst (e.g., present as a cementing constituent in a substrate such as tungsten carbide) liquefies and sweeps from a region adjacent to the volume of diamond particles into interstitial regions between the diamond particles during the HPHT process. The metal-solvent catalyst acts to promote intergrowth between the diamond particles, which results in the formation of a matrix of bonded diamond grains having diamond-to-diamond bonding therebetween, with interstitial regions between the bonded diamond grains being occupied by the metal-solvent catalyst.

The bonded together diamond grains of the PCD element 130 may exhibit an average grain size of about 100 μm or less, about 40 μm or less, such as about 30 μm or less, about 25 μm or less, or about 20 μm or less. For example, the average grain size of the diamond grains may be about 10 μm to about 18 μm, about 8 μm to about 15 μm, about 9 μm to about 12 μm, or about 15 μm to about 25 μm. In some embodiments, the average grain size of the diamond grains may be about 10 μm or less, such as about 2 μm to about 5 μm or submicron.

The diamond particle size distribution of the diamond particle may exhibit a single mode, or may be a bimodal or greater grain size distribution. In an embodiment, the diamond particles of the one or more layers of diamond particles may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger average particle size (e.g., 50 μm, 40 μm, 30 μm, 20 μm, 15 μm, 12 μm, 10 μm, 8 μm) and another portion exhibiting at least one relatively smaller average particle size (e.g., 12 μm, 10 μm, 8 μm, 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger average particle size between about 10 μm and about 40 μm and another portion exhibiting a relatively smaller average particle size between about 1 μm and 4 μm. In some embodiments, the diamond particles may comprise three or more different average particle sizes (e.g., one relatively larger average particle size and two or more relatively smaller average particle sizes), without limitation.

It is noted that the as-sintered diamond grain size may differ from the average particle size of the diamond particles prior to sintering due to a variety of different reasons, such as grain growth, diamond particles fracturing, carbon provided from another carbon source (e.g., dissolved carbon in the metal-solvent catalyst), or combinations of the foregoing.

The superhard element 130 may exhibit a thickness "t" of at least about 0.040 inch, such as about 0.045 inch to about 1 inch, about 0.045 inch to about 0.500 inch, about 0.050 inch to about 0.200 inch, about 0.065 inch to about 0.100 inch, about 0.070 inch to about 0.100 inch (e.g., about 0.09 inch), or about 0.045 inch to about 0.050 inch. The PCD element 130 may or may not include a catalyst or infiltrant disposed in at least a portion of the interstitial regions between the bonded diamond grains of the PCD element 130. The infiltrant may include, but is not limited to, iron, nickel, cobalt, and alloys of the foregoing metals. For example, the infiltrant may be provided from a substrate (e.g., cobalt from a cobalt-cemented carbide substrate).

In embodiments in which a region of the PCD element 130 includes substantially no catalyst or infiltrant (e.g., less than about 2% by weight, or no more than about 1% by weight), the catalyst or infiltrant may have been removed by leaching, for example, by immersing the PCD table 102 in an acid, such as aqua regia, nitric acid, hydrofluoric acid, mixtures thereof, or other suitable acid. Leaching PCD element 130 may form a leached region that extends inwardly from an exterior surface (including a lateral surface and any chamfer) to a selected leached depth. Examples of suitable leach depths may be about 100 μm to about 1000 μm, about 100 μm to about 300 μm, about 300 μm to about 425 μm, about 350 μm to about 400 μm, about 350 μm to about 375 μm, about 375 μm to about 400 μm, about 500 μm to about 650 μm, or about 650 μm to about 800 μm.

Any of various substrates may be suitable for use in forming PCD element 130. For example, a substrate may comprise a plurality of tungsten carbide or other carbide grains (e.g., tantalum carbide, vanadium carbide, niobium carbide, chromium carbide, and/or titanium carbide) cemented together with a metallic cementing constituent, such as cobalt, iron, nickel, or alloys thereof. For example, in an embodiment, the cemented carbide substrate is a cobalt-cemented tungsten carbide substrate. In some embodiments, the substrate may include two or more different carbides (e.g., tungsten carbide and chromium carbide).

The PCD element 130 may be formed separately from or integral with a substrate to which the PCD element 130 is finally attached in an HPHT process. When formed separately, the PCD element 130 may be subsequently attached to a substrate in another HPHT process. The temperature of such HPHT processes (for sintering diamond particles to form the PCD element 130 as well as for subsequent attachment of an already formed PCD element to a substrate) may typically be at least about 1000° C. (e.g., about 1200° C. to about 1600° C.) and the pressure of the HPHT process may typically be at least about 4.0 GPa (e.g., about 5.0 GPa to about 12.0 GPa, about 7.0 GPa to about 9.0 GPa, about 6.0 GPa to about 8.0 GPa, or about 9.0 GPa to about 12.0 GPa). Examples of methods for fabricating the superhard bearing elements and superhard materials and/or structures from which the superhard bearing elements may be made are disclosed in U.S. Pat. Nos. 7,866,418; 7,998,573; 8,034,136; and 8,236,074. The disclosure of each of U.S. Pat. Nos. 7,866,418; 7,998,573; 8,034,136; and 8,236,074 is incorporated herein, in its entirety, by this reference.

Figure 11:
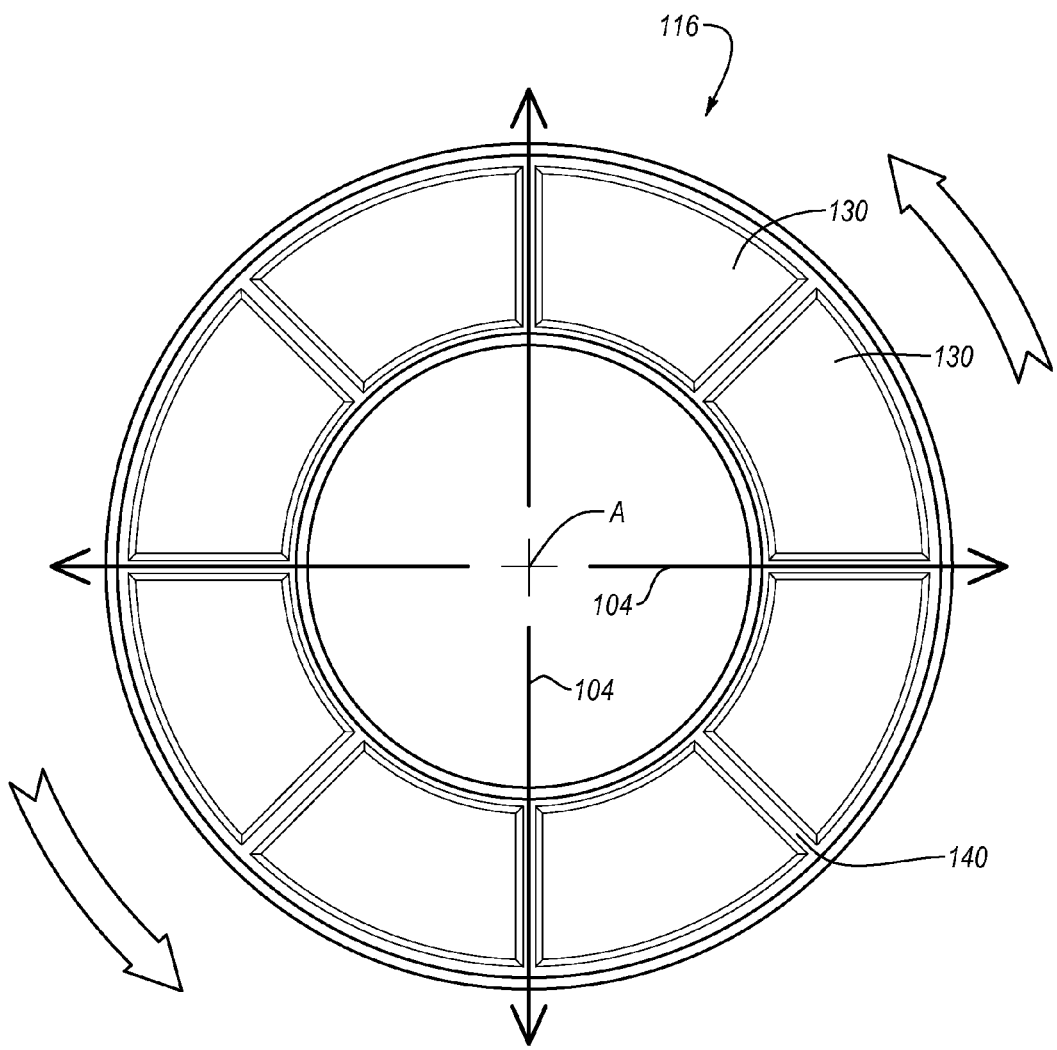
FIG. 11 is a top view of a thrust-bearing assembly having radial-extending gaps or channels according to an embodiment.

In an embodiment, superhard bearing elements 130 are disposed circumferentially around rotatable shaft 112 so that superhard bearing elements 130 are disposed adjacent to one another with respective gaps or channels 140 defined between adjacent superhard bearing elements 130. The terms gap and channel may be used interchangeably herein in reference to feature 140. Gaps or channels 140 allow flow of lubricating fluid 104 therethrough. In an embodiment, gaps or channels 140 may extend radially (i.e., radially aligned with a longitudinal center axis through shaft 112). Such a configuration is shown in FIG. 11. During operation, rotation of bearing assembly 116 will cause lubricating fluid 104 to flow outward via gaps or channels 140 creating a region of low pressure in the center, drawing additional lubricating fluid 104 into that region.

Figure 12:
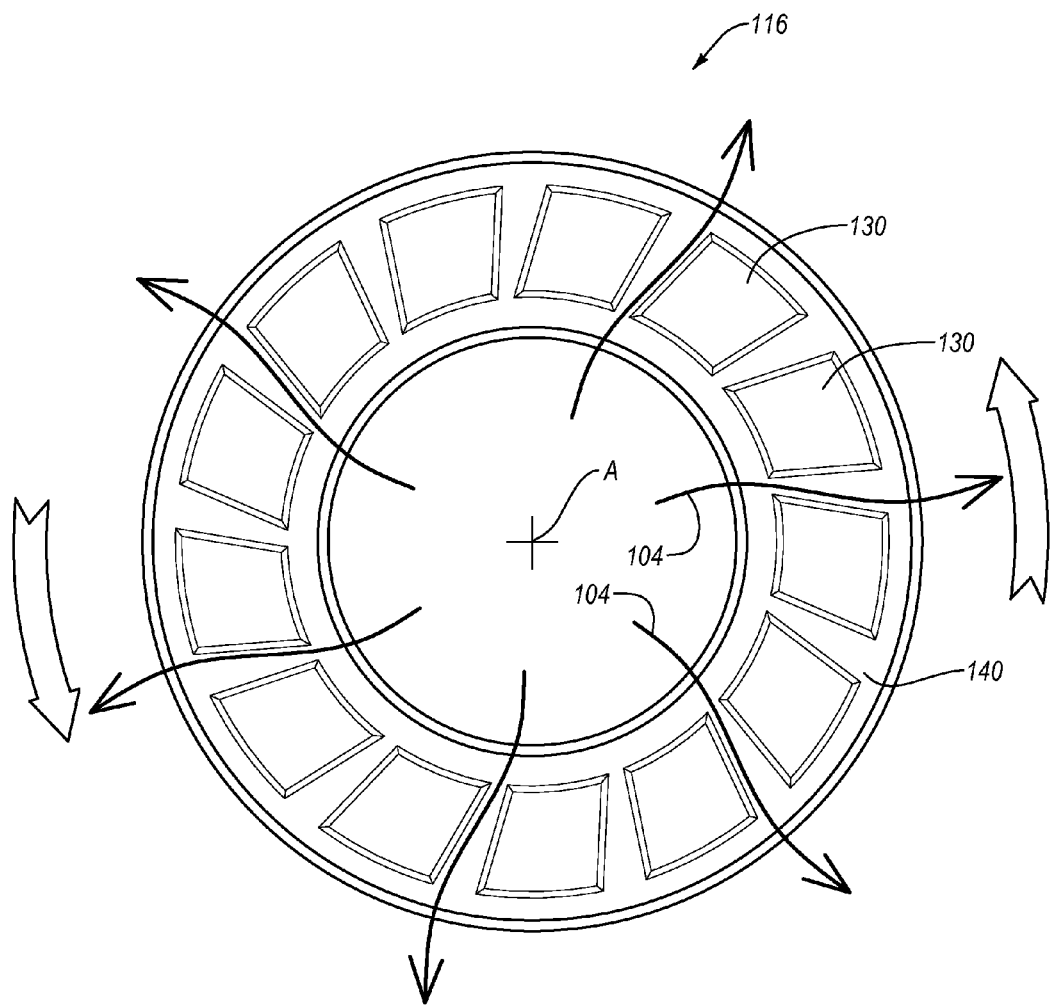
FIG. 12 is a top view of a thrust-bearing assembly with angled gaps or channels according to an embodiment.
Figure 13:
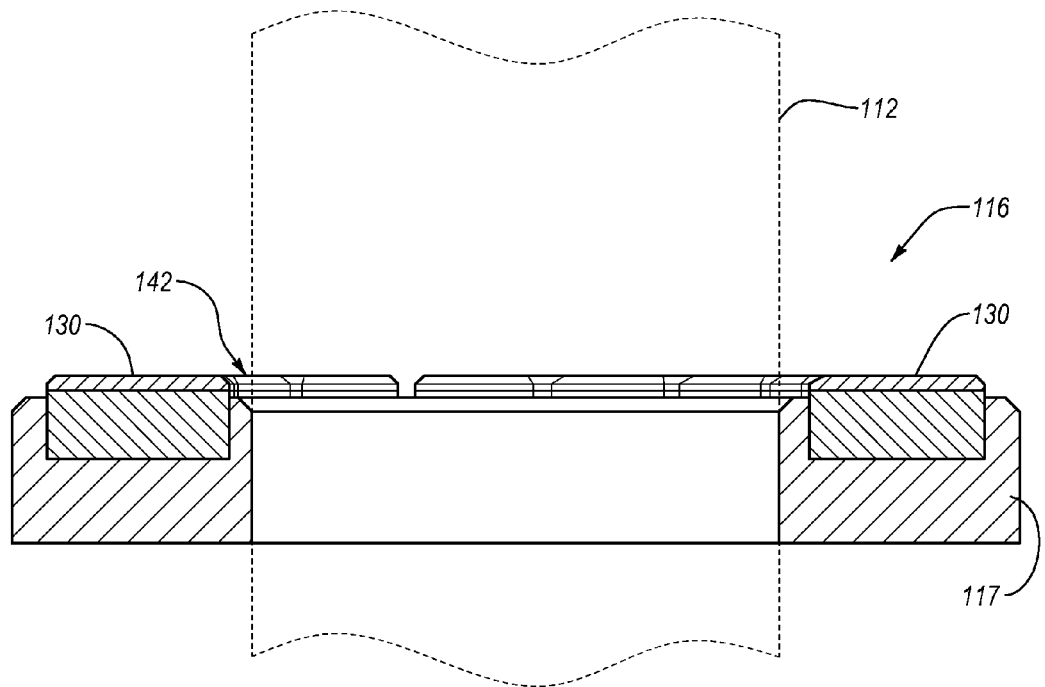
FIG. 13 is a cross-sectional view of the bearing assembly shown in FIG. 10.

In another embodiment, as shown in FIGS. 10, 12, and 13 gaps or channels 140 may be angled with respect to the longitudinal axis A, so that they are not aligned with a radial line. This is shown in FIG. 12. During operation, rotation of bearing assembly 116 causes lubricating fluid 104 to flow outward via channels 140 creating a region of low pressure in the center, drawing additional lubricating fluid 104 into that region. The angle of channels 140 may increase the pressure gradient, thereby increasing the rate at which lubricating fluid 104 is drawn into the region 134 adjacent holes 136, and thrown outwardly into housing 102. In one such embodiment, and as shown in FIG. 12, one or more of the bearing surfaces of the superhard bearing elements may be configured substantially as a parallelogram. As used herein, the term "parallelogram" is to be broadly construed. For example, the inner and outer edges of a parallelogram superhard bearing element may not be straight, but may be curved, if desired. Such curved inner and outer edges may define substantially congruent or offset curves. In addition, the side edges of such a superhard bearing element may not be exactly parallel to one another (e.g., they may be within about 30°, 20°, or 10° of one another), and thus the lengths of substantially parallel sides may also differ from one another. For example, the substantially parallelogram shaped superhard elements 130 shown in FIG. 12 include side edges 142 and 144 that in fact would intersect one another, but are within about 30° of each other. For example, the superhard bearing elements may be wedge shaped or generally trapezoidal (e.g., including two substantially parallel or congruent sides in which one may be shorter than the other). In addition to including straight sides, one or more of the sides may be curved.

Superhard bearing elements 132 may be similarly configured, except that stator bearing assembly 114 may be fixed so as to not rotate relative to housing 102. For example, superhard bearing elements 132 may be made from any of the materials and structures disclosed herein for superhard bearing elements 130.

Figure 14:
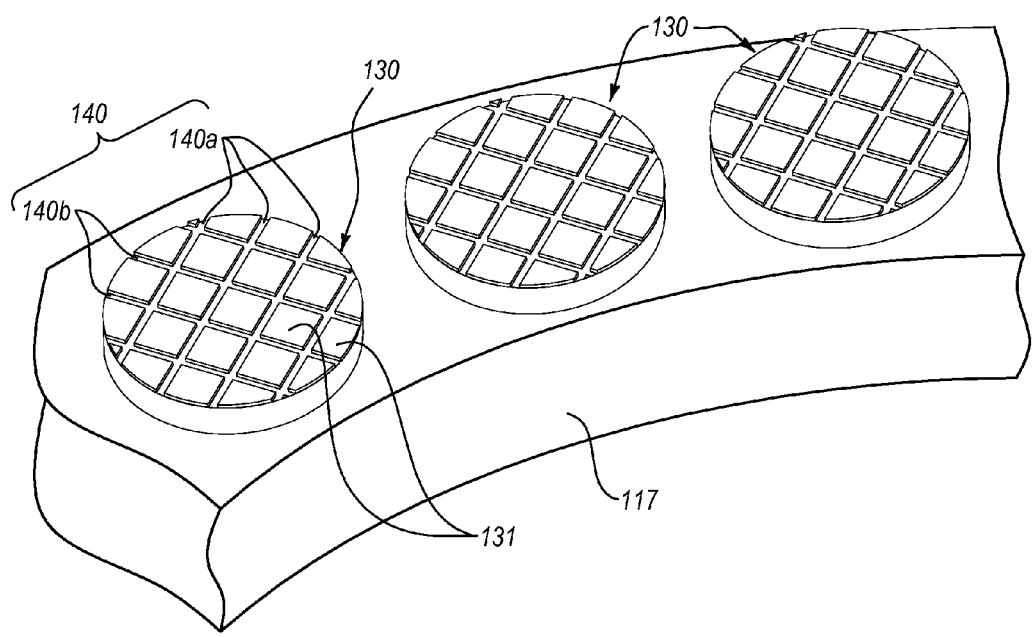
FIG. 14 is an isometric view of a portion of a bearing assembly according to another embodiment.
Figure 15A:
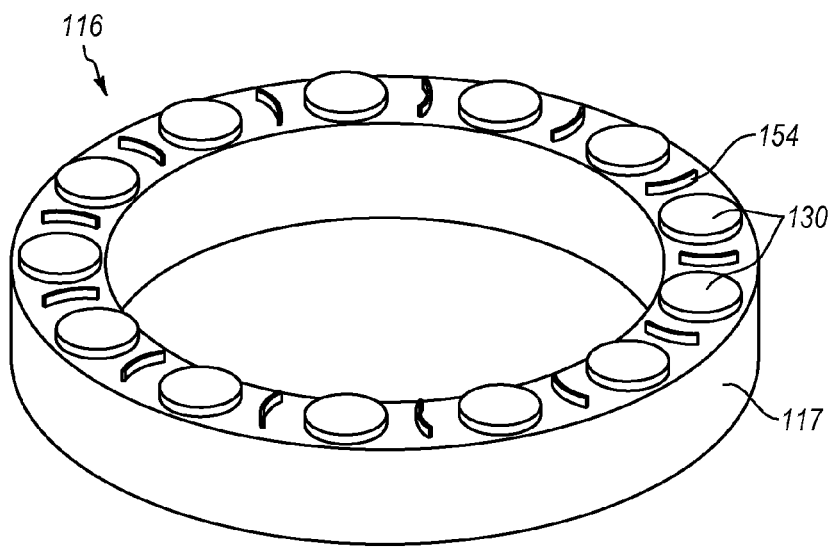
FIG. 15A is an isometric view of a bearing assembly according to another embodiment.
Figure 15B:
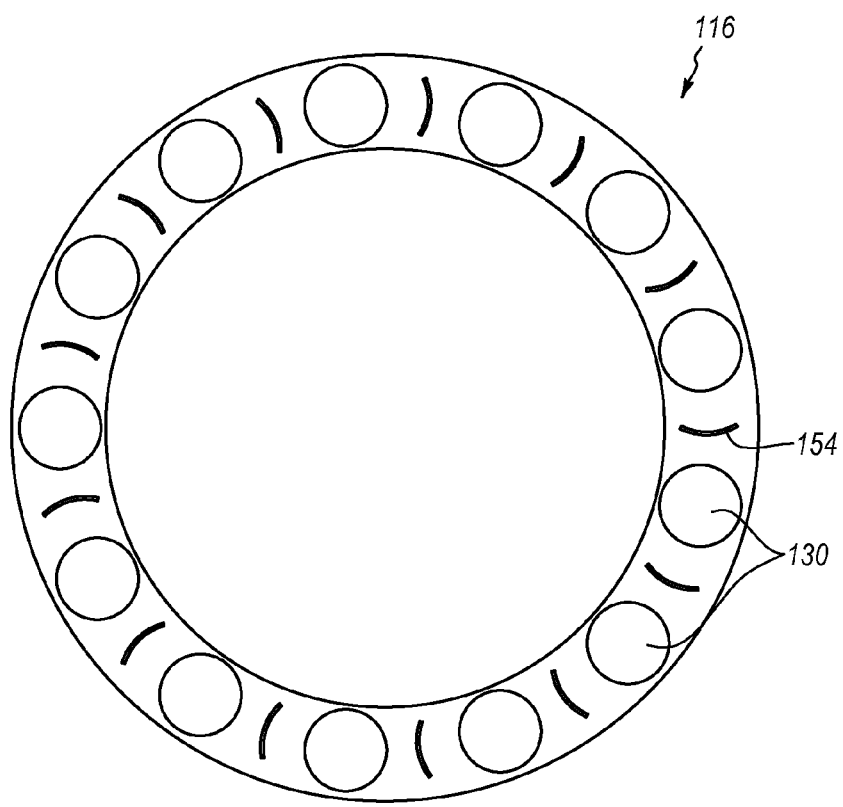
FIG. 15B is top plan view of the bearing assembly of FIG. 15A.

Another embodiment of a bearing assembly configuration is shown in FIG. 14, which includes a plurality of superhard bearing elements 130, each including a grid-like pattern mounted on support ring 117 so that superhard bearing elements 130 comprise a plurality of raised or proud bearing surfaces 131 separated by respective gaps or channels 140 defined between adjacent proud or raised portions 131 of superhard bearing elements 130. Gaps or channels 140 may collectively provide a grid-like pattern that promotes cooling due to lubricating fluid flow therein. Gaps 140a may be substantially parallel to one another and are generally perpendicular to gaps 140b. Similarly, gaps 140b are substantially parallel to one another, and are generally perpendicular to gaps 140a. Proud portions 131 of superhard bearing elements 130 may extend above gaps 140, so as to resemble a "tile-like" geometry. However, other gap configurations may be employed, such as any of the embodiments disclosed in U.S. application Ser. No. 13/306,332 which is incorporated herein, in its entirety, by this reference. Proud portions 131 of superhard bearing elements 130 may be square, rectangular, triangular, hexagonal, or any other suitable shape. Such a configuration may be employed as a stator, rotor, or both, as desired. Other configurations for bearing assemblies with gaps between superhard bearing elements is disclosed in U.S. patent application Ser. No. 13/550,835, which is incorporated herein, in its entirety, by this reference. Circulation of lubricating fluid 104 may be facilitated through use of a pump (not shown) and/or rotation of shaft 112 and bearing assemblies 114, 116, 214, 216. As shown in FIGS. 15A and 15B, one or more of the bearing assemblies (e.g., a rotor) may include circulation assisting vanes 154 which may serve to circulate lubricating fluid 104 through shaft 112 and housing 102.

To assist in circulation, the bearing pads of one or more of the bearing assemblies may be shaped or configured to operate similar to pump vanes, as shown in FIG. 10 or 12. In addition, vanes may be placed on the rotor that effectively serve to pump lubricating fluid through the recirculation cycle (through region 103, cavity 134, and around again), as seen in FIGS. 15A and 15B. In other embodiments pump or fluid impelling features extending from the shaft may aid in circulating the lubricating fluid. In other words, rotation of the shaft may provide a motive force to circulate the lubricating fluid. U.S. patent application Ser. Nos. 13/410,514 and 13/550,821, each of which is incorporated herein, in its entirety, by reference, describe various mixing feature structures that may extend from the bearing assemblies. Such structures may facilitate circulation of the lubricating fluid 104. Similar structures could also be included extending from shaft 112 to circulate lubricating fluid 104.

Figure 16:
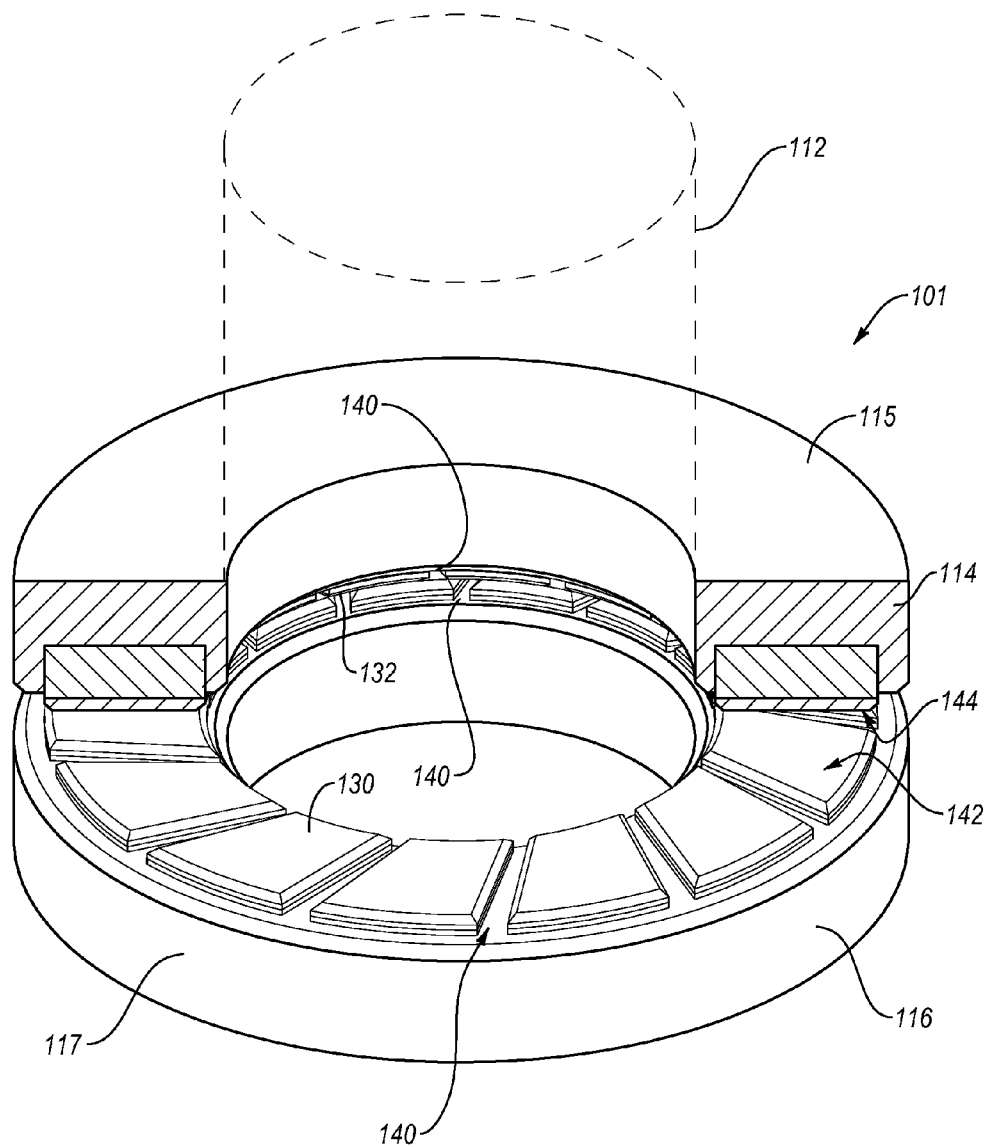
FIG. 16 is an isometric view of two bearing assemblies with substantially planar bearing surfaces oriented so as to oppose one another.

As shown in FIGS. 13 and 16, rotor bearing assembly 116 defines a substantially planar corresponding bearing surface 142. Stator bearing assembly 114 may be similarly configured, so as to also include a corresponding bearing surface 144 (FIG. 14). FIG. 16 shows both rotor bearing assembly 116 and stator bearing assembly 114 of bearing apparatus 101 together. During operation, as shown in FIG. 16, bearing surface 142 of bearing assembly 116 may be oriented so as to be substantially opposed to bearing surface 144. The superhard bearing elements 130 of bearing assembly 116 may be disposed in the same relationship as the superhard bearing elements 132 of bearing assembly 114. In another embodiment, the superhard bearing elements 130 may be shaped, oriented, or otherwise configured differently than bearing elements 132. In the embodiment illustrated in FIG. 16, stator bearing assembly 116 includes superhard bearing elements 130 disposed on support ring 117 and rotor bearing assembly 114 includes superhard bearing elements 132 disposed on support ring 115. As shown, bearing assembly 116 and rotor bearing assembly 114 both may comprise gaps or channels 140 between adjacent superhard bearing elements 130, 132 that are angled with respect to the axis of rotation of shaft 112, as shown in FIG. 16. In an embodiment, channels 140 of complementary bearing assemblies 114 and 116 may be configured the same as one another.

Figure 17:
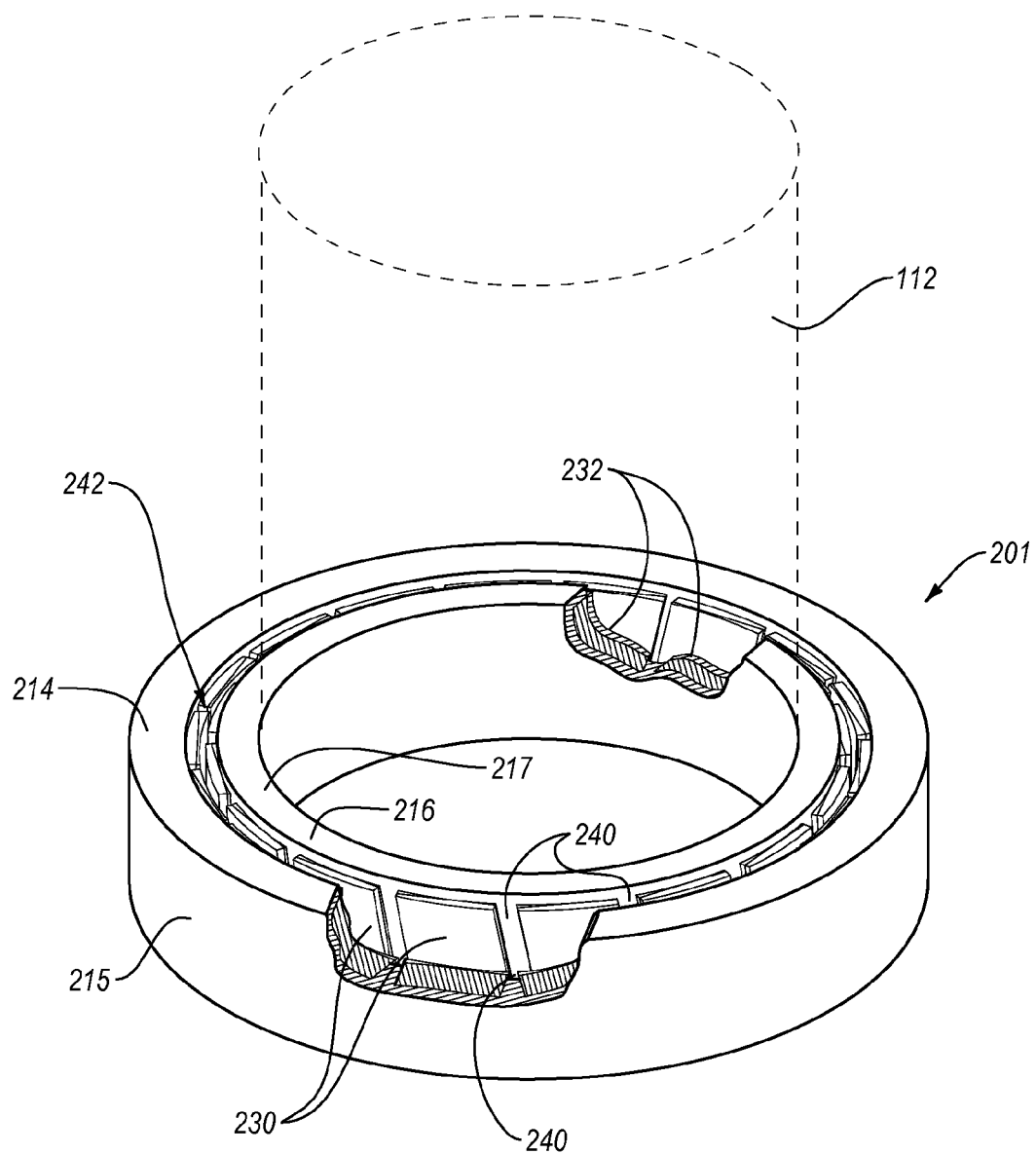
FIG. 17 is an isometric view of two radial bearing assemblies according to an embodiment.

The concepts described may also be employed in radial bearing assemblies and apparatuses. FIG. 17 shows a radial bearing apparatus 201 including an outer radial bearing assembly 214 (e.g., a stator) and an inner bearing assembly 216 (e.g., a rotor). Inner bearing assembly 216 and outer bearing assembly 214 each may comprise a plurality of superhard bearing elements 230, 232, respectively that are disposed circumferentially around the axis of rotation of shaft 112. As shown, each pair of adjacent superhard bearing elements 230 and 232 is separated by channels 240. Each bearing assembly 214 and 216 may include a support ring 215 and 217, respectively extending about the rotation axis. The support rings 215 and 217 may define a central opening (e.g., into which rotatable shaft 112 is received), and may support superhard bearing elements 232 and 230, respectively, that are disposed on each support ring 215, 217. The radial bearing configuration results in a substantially cylindrical bearing surface 242 between superhard bearing elements 230 and 232 that is concentric to the axis of rotation of shaft 112. Any of the various features shown and described in the context of a thrust-bearing assembly may be employed in a radial bearing assembly.

Figure 18:
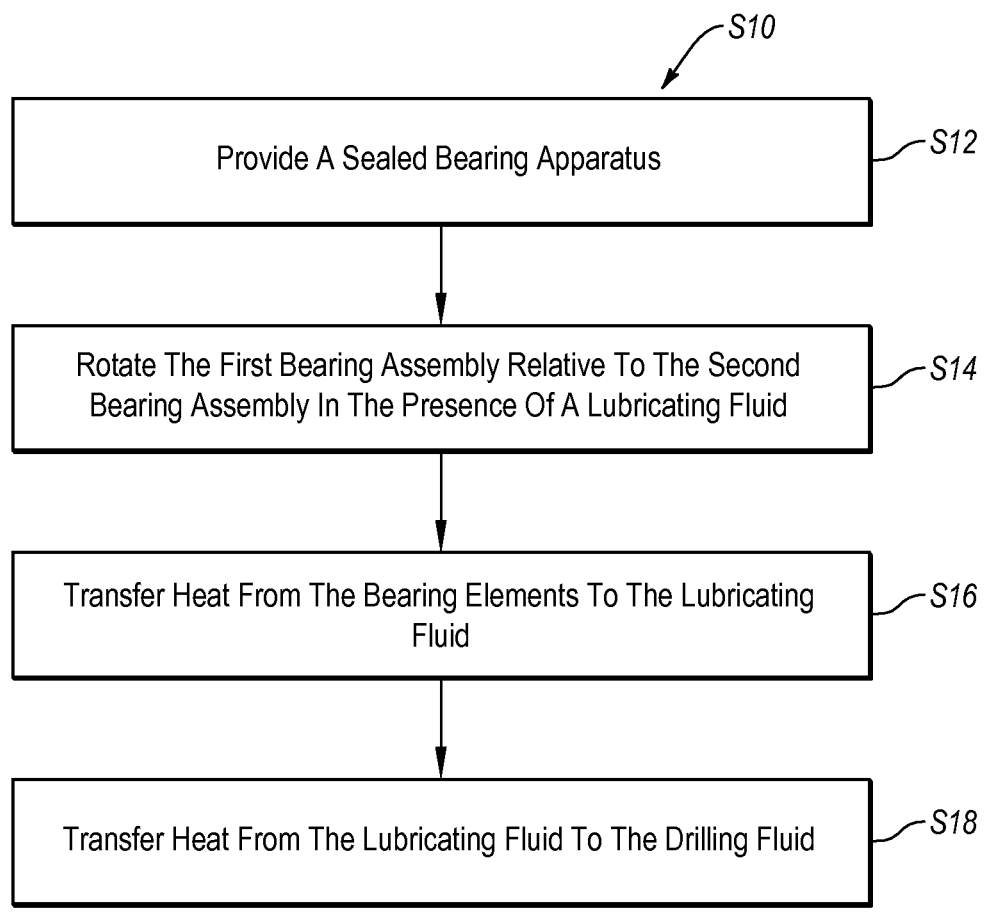
FIG. 18 is a flowchart depicting a process by which heat may be dissipated from bearing elements to a drilling fluid through an intermediate lubricating fluid according to an embodiment.

FIG. 18 is a flow chart describing an embodiment of a method S10 for lubricating a sealed bearing apparatus so as to dissipate heat generated during operation of any of the bearing apparatuses disclosed herein. During circulation of the lubricating fluid within the housing, the lubricating fluid transfers heat generated during operation of the bearing apparatus from the superhard bearing elements and eventually to the drilling fluid (e.g., through the housing, shaft, or both). At S12, a sealed bearing apparatus is provided. Such a sealed bearing apparatus includes a lubricating fluid disposed within the housing. The lubricating fluid is effectively isolated from a drilling fluid present in the borehole (and shaft) into which the bearing apparatus is inserted. The sealed bearing apparatus includes first and second bearing assemblies, each including a plurality of superhard bearing elements that are oriented to be generally opposed to one another (e.g., thrust, radial, and/or tapered). At S14, the first bearing assembly (e.g., a rotor) is rotated relative to the second bearing assembly (e.g., a stator) in the presence of lubricating fluid. Upon rotation of the rotor bearing assembly relative to the stator bearing assembly while a thrust or other load is applied thereto, the superhard bearing elements generate heat. At S16, heat is transferred from the superhard bearing elements to the lubricating fluid, increasing the temperature of the lubricating fluid. At S18, heat is transferred from the lubricating fluid to the drilling fluid. The presence of any optional cooling elements (e.g., fins or other cooling features disclosed herein) may increase the rate of heat transfer to the drilling fluid. Circulating the lubricating fluid from one end of the housing into a circulation cavity in the hollow rotatable shaft or housing for conveyance to the other end of the housing may facilitate recirculation of the lubricating fluid, drawing heat away from the superhard bearing elements.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A bearing apparatus, comprising:
a housing having a first end spaced from a second end, the housing defining a sealed enclosure;
a lubricating fluid contained at least partially within the housing;
a rotatable shaft disposed at least partially within the housing, the rotatable shaft including at least one circulation cavity through which the lubricating fluid may flow;
a first bearing assembly including a plurality of first superhard bearing elements each of which includes a first superhard bearing surface, the first bearing assembly disposed within the housing so as to be exposed to the lubricating fluid during use, the first bearing assembly being configured to rotate with the rotatable shaft; and
a second bearing assembly including a plurality of second superhard bearing elements each of which includes a second superhard bearing surface, the second bearing assembly disposed within the housing so as to be exposed to the lubricating fluid during use, the second superhard bearing surfaces of the second bearing assembly being opposed to the first superhard bearing surfaces of the first bearing assembly.

2. The bearing apparatus of claim 1 wherein one or more of the plurality of first and second superhard bearing elements comprise polycrystalline diamond.

3. The bearing apparatus of claim 1, wherein the rotatable shaft extends through the first and second bearing assemblies.

4. The bearing apparatus of claim 1 wherein the first bearing assembly is configured as a rotor and the second bearing assembly is configured as a stator.

5. The bearing apparatus of claim 1, further comprising one or more cooling elements.

6. The bearing apparatus of claim 5 wherein the one or more cooling elements are disposed on and extend from an exterior of the housing.

7. The bearing apparatus of claim 5 wherein the one or more cooling elements include one or more fins.

8. The bearing apparatus of claim 1 wherein the rotatable shaft includes one or more circulation holes providing fluid communication between the at least one circulation cavity and a housing region within the housing containing the bearing elements so that the lubricating fluid may flow from the at least one circulation cavity into the housing region or vice versa.

9. The bearing apparatus of claim 8 wherein at least one of the one or more circulation holes is disposed adjacent to the first bearing assembly and the second bearing assembly so as to deliver the lubricating fluid to a region between the first and second bearing assemblies during use.

10. The bearing apparatus of claim 1 wherein the lubricating fluid is physically separate from drilling fluid that drives rotation of the shaft during use.

11. The bearing apparatus of claim 1 wherein:
the first superhard bearing elements of the first bearing assembly define a plurality of gaps through which the lubricating fluid may flow, with each of the plurality of gaps disposed between adjacent first superhard bearing elements of the plurality of first superhard bearing elements; and
the second superhard bearing elements of the second bearing assembly define a plurality of gaps through which the lubricating fluid may flow, with each of the plurality of gaps disposed between adjacent second superhard bearing elements of the plurality of second superhard bearing elements.

12. The bearing apparatus of claim 1 wherein at least one of the bearing surfaces of the plurality of first or second superhard bearing elements is configured as a parallelogram.

13. The bearing apparatus of claim 1, further comprising a heat exchanger configured to transfer heat from the lubricating fluid.

14. The bearing apparatus of claim 1, further comprising one or more cooling elements disposed on the rotatable shaft.

15. The bearing apparatus of claim 1, wherein at least one of the first or second bearing assemblies includes mixing features thereon.

16. The bearing apparatus of claim 1, further comprising:
a first seal configured to form a fluid-tight connection between the first end of the housing and the rotatable shaft; and
a second seal configured to form a fluid-tight connection between the second end of the housing and the rotatable shaft.

17. The bearing apparatus of claim 1, further comprising a pressure compensation mechanism configured to compensate for a pressure differential between a drilling fluid exterior to the housing and the lubricating fluid sealed within the housing.

18. A bearing apparatus, comprising:
a housing having a first end spaced from a second end, the housing configured to be substantially sealed to contain a lubricating fluid therein;
a rotatable shaft at least partially received by the housing, the rotatable shaft including at least one circulation cavity through which the lubricating fluid may flow;
a first seal configured to form a fluid-tight connection between the first end of the housing and the rotatable shaft;
a second seal configured to form a fluid-tight connection between the second end of the housing and the rotatable shaft;
a rotor bearing assembly disposed within the housing, the rotor bearing assembly including a plurality of first superhard bearing elements configured as parallelograms, the rotor bearing assembly being configured to be disposed circumferentially about the rotatable shaft received through the housing such that the parallelogram superhard bearing elements of the rotor bearing assembly form a first set of channels; and
a stator bearing assembly disposed within the housing, the stator bearing assembly including a second plurality of superhard bearing elements configured as parallelograms, the stator bearing assembly being configured to be disposed circumferentially about the rotatable shaft received through the housing such that the parallelogram superhard bearing elements of the stator bearing assembly form a second set of channels.

19. A method for lubricating a bearing apparatus so as to dissipate heat generated during operation of the bearing apparatus, the method comprising:
providing the bearing apparatus including:
a closed lubrication system containing a lubricating fluid sealed between a housing and a rotatable shaft disposed at least partially within the housing, the rotatable shaft having at least one circulation cavity through which the lubricating fluid may flow;
a first bearing assembly including a plurality of first superhard bearing elements;
a second bearing assembly including a plurality of second superhard bearing elements that are opposed to the first superhard bearing elements of the first bearing assembly;
rotating the first bearing assembly relative to the second bearing assembly in the presence of at least a portion of the lubricating fluid;
transferring heat from the first and second superhard bearing elements of the first and second bearing assemblies to the lubricating fluid; and
transferring heat from the lubricating fluid to a drilling fluid in thermal communication with the closed lubrication system.

20. The method of claim 19 wherein rotating the first bearing assembly relative to the second bearing assembly comprises rotating the first bearing assembly relative to the second bearing assembly at a rotation rate of about 100 revolutions per minute or greater.

21. The method of claim 19 wherein rotating the first bearing assembly relative to the second bearing assembly comprises rotating the first bearing assembly relative to the second bearing assembly at a rotation rate of about 250 revolutions per minute or greater.

22. The method of claim 19, further comprising circulating the lubricating fluid through the closed lubrication system.

23. The method of claim 22 wherein circulating the lubricating fluid through the closed lubrication system includes moving the lubricating fluid through gaps between adjacent ones of the first or second plurality of superhard bearing elements.

24. The method of claim 22, further comprising rotating the rotatable shaft to provide a motive force that circulates the lubricating fluid.

* * * * *